US011443663B2

(12) United States Patent
Dewaele et al.

(10) Patent No.: US 11,443,663 B2
(45) Date of Patent: Sep. 13, 2022

(54) ADJUSTABLE SUPPORT STRUCTURE FOR DISPLAY TILE

(71) Applicants: BARCO N.V., Kortrijk (BE); BARCO CONTROL ROOMS GMBH, Karlsruhe (DE)

(72) Inventors: Tom Adriaan Gerard Dewaele, Antwerp (BE); Frank Michael Fischer, Salzburg (AT); Stephan Frank Henry, Konigsbach-Stein (DE)

(73) Assignees: BARCO N.V., Kortrijk (BE); BARCO CONTROL ROOMS GMBH, Karlsruhe (DE)

( * ) Notice: Subject to any disclaimer, the term of this patent is extended or adjusted under 35 U.S.C. 154(b) by 668 days.

(21) Appl. No.: 16/305,122

(22) PCT Filed: Aug. 17, 2018

(86) PCT No.: PCT/EP2018/072352
§ 371 (c)(1),
(2) Date: Nov. 28, 2018

(87) PCT Pub. No.: WO2019/034786
PCT Pub. Date: Feb. 21, 2019

(65) Prior Publication Data
US 2020/0090560 A1 Mar. 19, 2020

(30) Foreign Application Priority Data
Aug. 18, 2017 (EP) .................................... 17186982

(51) Int. Cl.
*G09F 9/302* (2006.01)
*G06F 3/14* (2006.01)
*G09F 9/33* (2006.01)

(52) U.S. Cl.
CPC .......... *G09F 9/3026* (2013.01); *G06F 3/1446* (2013.01); *G09F 9/33* (2013.01)

(58) Field of Classification Search
CPC . G09F 9/00; G09F 9/0021; G09F 7/18; G09F 15/00; G06F 1/1601; Y10T 403/595; Y10T 403/591
See application file for complete search history.

(56) References Cited

U.S. PATENT DOCUMENTS 3,894,445 A * 7/1975 Rowe ....................... H03G 3/02
74/512
7,055,271 B2 * 6/2006 Lutz .......................... G09F 7/18
40/452

(Continued)

FOREIGN PATENT DOCUMENTS

CA        2912044 A1    5/2016
CN      102959606 A     3/2013
(Continued)

OTHER PUBLICATIONS

Extended European Search Report for European Application No. 17186982.9, dated Nov. 6, 2017.
(Continued)

*Primary Examiner* — Christopher E Leiby
(74) *Attorney, Agent, or Firm* — Hamre, Schumann, Mueller & Larson, P.C.

(57) ABSTRACT

A support substructure for fastening a display tile to a support structure of a tiled display, where the support substructure is linked to the support structure by means of a first mechanism allowing movements of the display tile in a plane parallel to the nominal plane (XY) of the tiled display independently of the presence or absence of adjacent display tiles.

17 Claims, 23 Drawing Sheets

(56) References Cited

U.S. PATENT DOCUMENTS

| | | | |
|---|---|---|---|
| 7,869,198 B1* | 1/2011 | Nearman | G06F 1/1601 361/679.01 |
| 8,384,616 B2 | 2/2013 | Elliott et al. | |
| 9,886,877 B2 | 2/2018 | Declerck | |
| 2003/0217495 A1* | 11/2003 | Nagamine | G09F 9/00 40/605 |
| 2005/0081414 A1* | 4/2005 | Lutz | G09F 7/18 40/564 |
| 2006/0236329 A1* | 10/2006 | Sugiura | B60R 11/02 720/675 |
| 2009/0295174 A1* | 12/2009 | Corrales | E05B 81/14 292/169.14 |
| 2012/0224311 A1* | 9/2012 | Sutherland | G06K 9/00335 361/679.01 |
| 2014/0259634 A1* | 9/2014 | Cox | G09F 19/228 29/592.1 |
| 2017/0003570 A1* | 1/2017 | Harris | G02F 1/167 |
| 2017/0033154 A1 | 2/2017 | Lan et al. | |
| 2017/0083273 A1 | 3/2017 | Kim et al. | |
| 2017/0127539 A1* | 5/2017 | Drabant | G09F 15/0031 |
| 2020/0057594 A1* | 2/2020 | Nakano | G09F 9/40 |

FOREIGN PATENT DOCUMENTS

| | | |
|---|---|---|
| CN | 104723074 A | 6/2015 |
| CN | 105940440 A | 9/2016 |
| CN | 106463083 A | 2/2017 |
| CN | 206282554 U | 6/2017 |
| DE | 102015001531 A1 | 8/2016 |
| EP | 2636937 A2 | 9/2013 |
| EP | 3059725 A1 | 8/2016 |
| GB | 2528029 A | 1/2016 |
| WO | 2009152524 A2 | 12/2009 |
| WO | 2013192614 A2 | 12/2013 |
| WO | 2019034786 A1 | 2/2019 |

OTHER PUBLICATIONS

International Search Report and Written Opinion in corresponding PCT Application No. PCT/EP2019/083169, dated Jul. 24, 2020.
Chinese Office Action in corresponding Chinese Application No. 202020379761.3, dated Oct. 12, 2020.
Chinese Office Action in corresponding Chinese Application No. 201821339222.6, dated Apr. 23, 2019.
Taiwan Office Action in corresponding Taiwan Application No. 10840597860, dated May 2, 2019.
International Search Report and Written Opinion for related PCT Application No. PCT/EP2018/072352, dated Dec. 4, 2018.
Office Action issued in corresponding Chinese application No. 201810947213.3, dated Apr. 26, 2021, with English translation, 32 pages provided.
International Preliminary Report on Patentability in corresponding PCT Application No. PCT/EP2018/072352, dated Dec. 3, 2019.
Office Action and Search Report issued in Taiwanese Application No. 107128845, dated Feb. 23, 2022, with English translation.
Office Action issued in corresponding Chinese Application No. 201810947213.3, dated Mar. 15, 2022, with English translation.

* cited by examiner

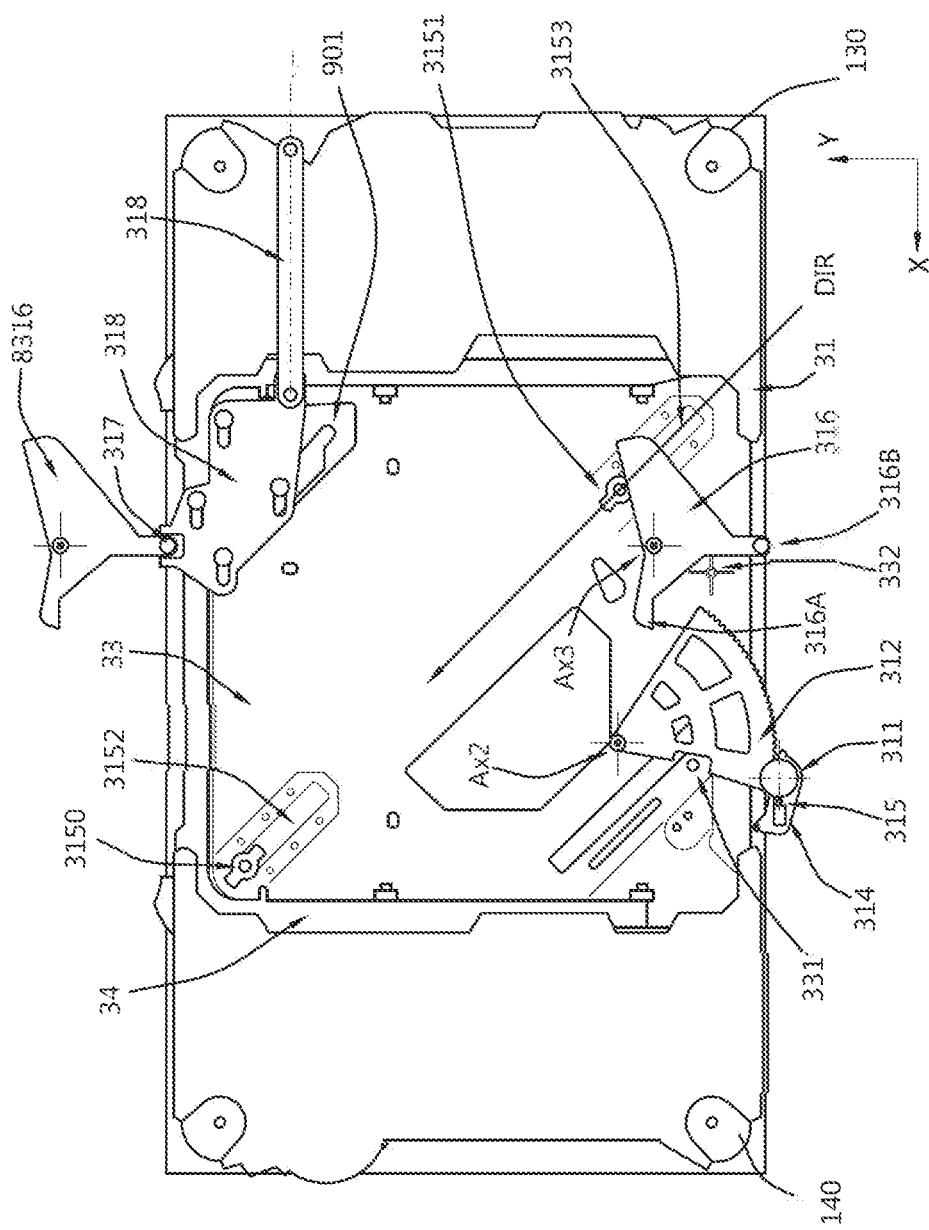

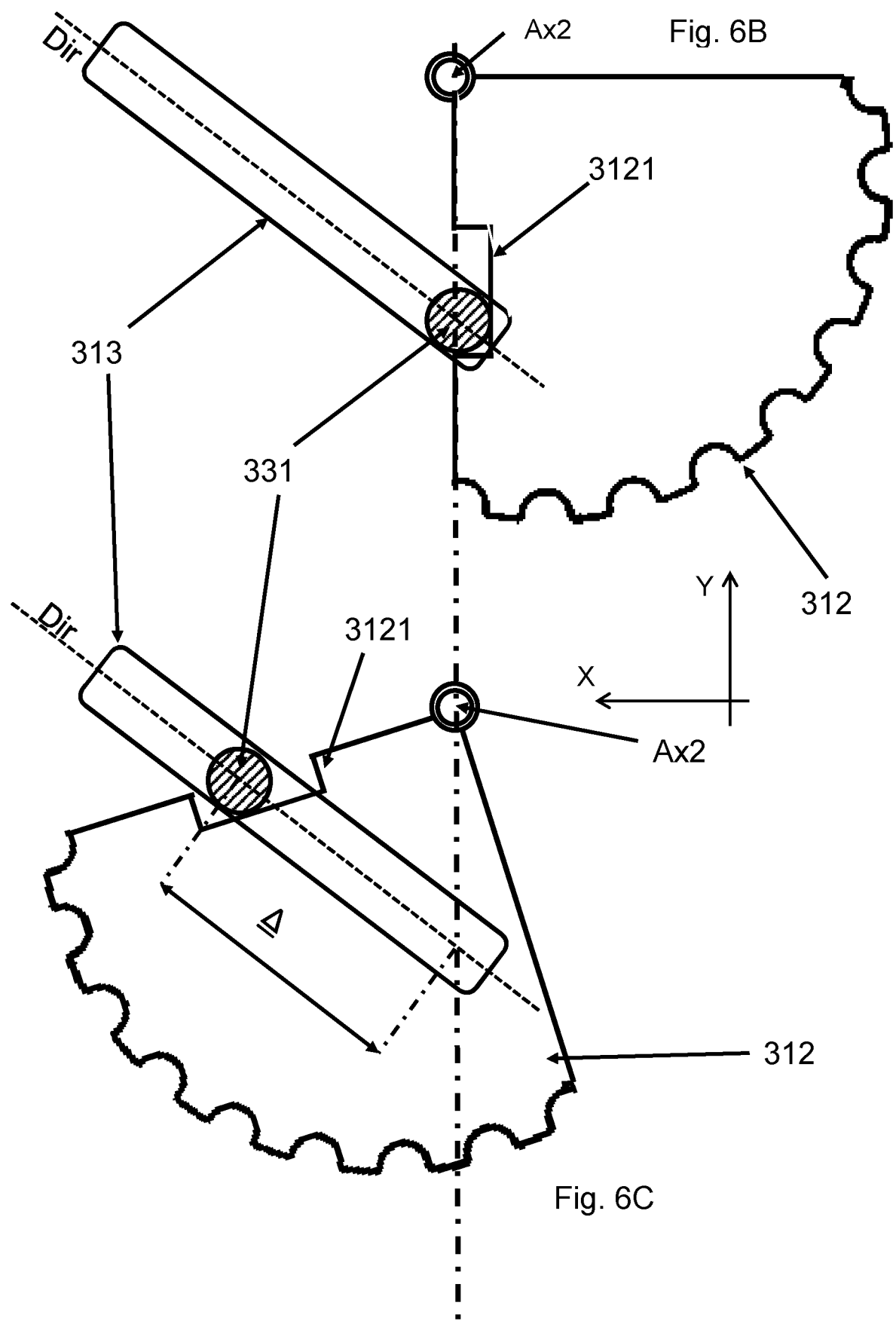

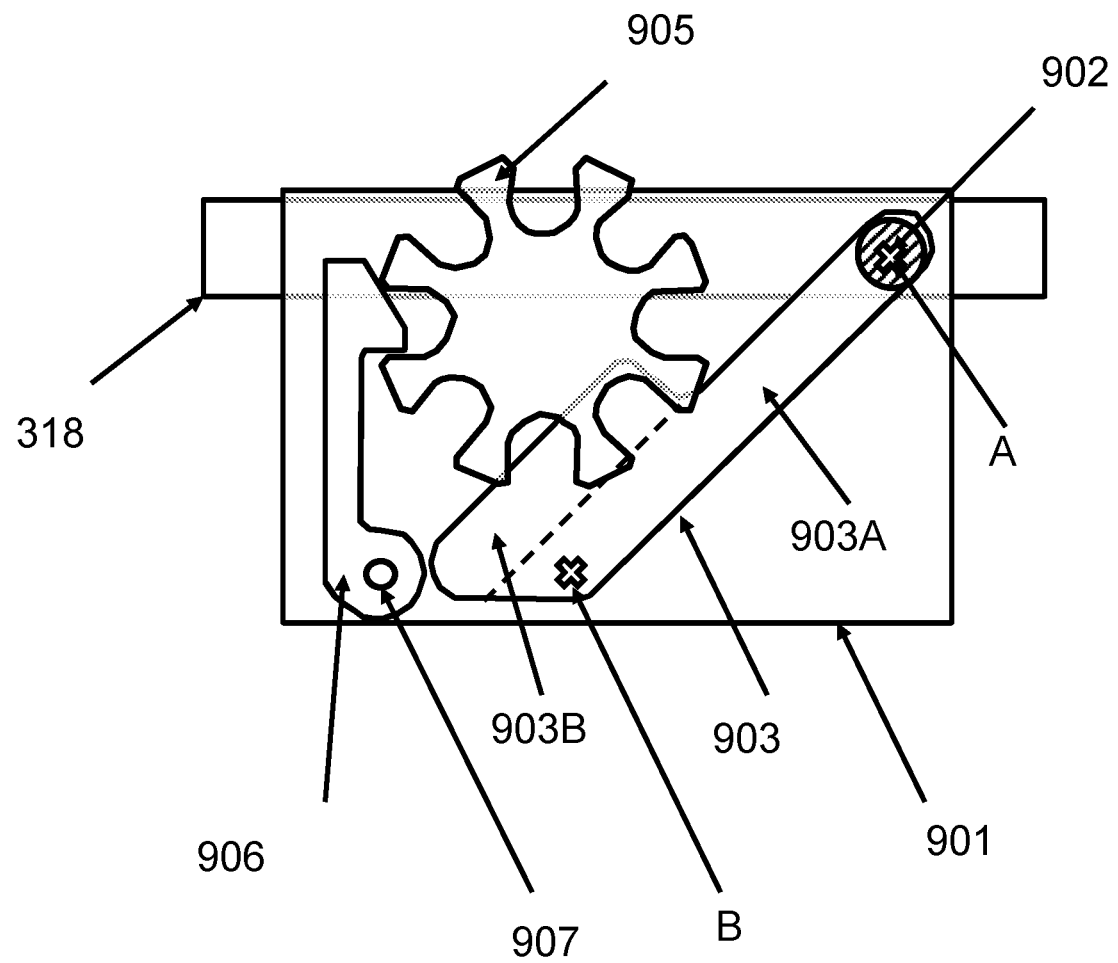
Fig. 9A
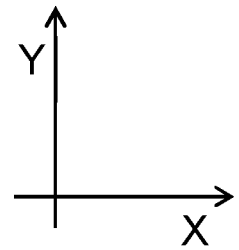

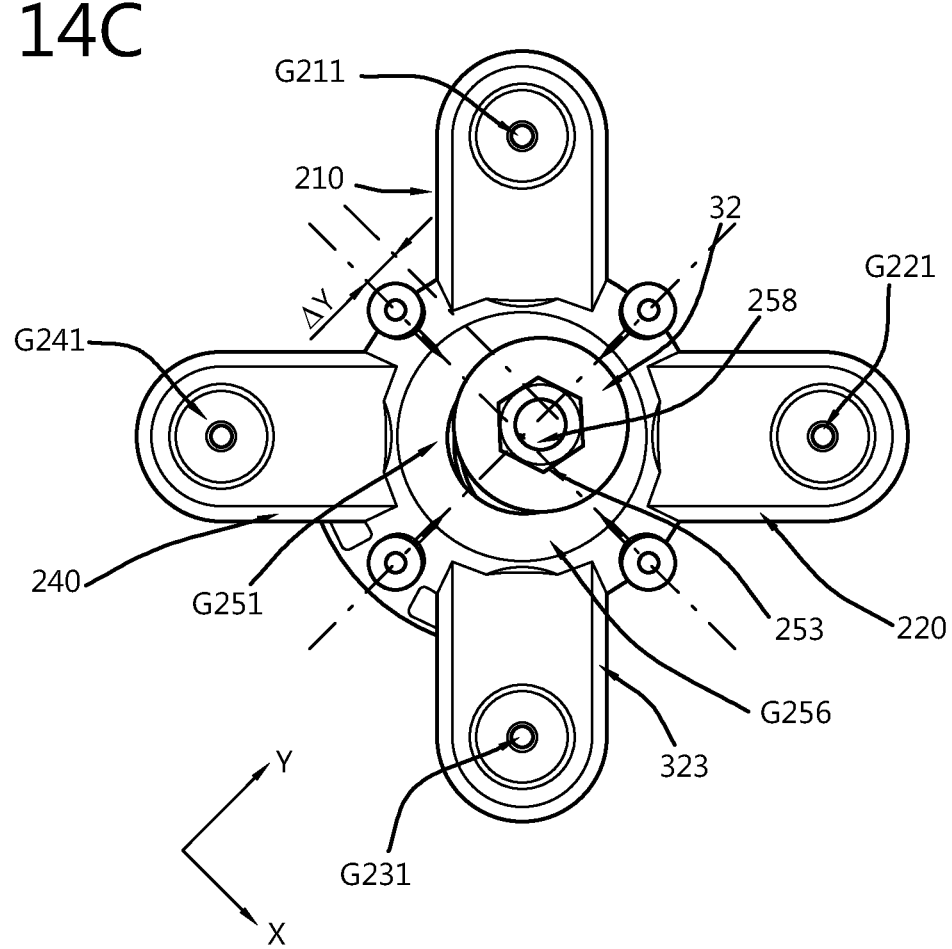

ADJUSTABLE SUPPORT STRUCTURE FOR DISPLAY TILE

The present invention relates to adjustable supports for display tiles, as well as arrays of display tiles that have adjustable supports.

BACKGROUND OF THE INVENTION

The problem of the alignment of the tiles in a tiled display is well known in the art. Alignment of the tiles is important to avoid introducing visual artefacts in the images displayed by the tiled display. Not only must tiles be parallel but the space between them, the seam, must have the same width throughout the tiled display.

The width of the seam may vary in function of the position on the tiled display because of e.g. tolerances in the dimensions of the profiles or beams that are assembled to form a support structure for the tiles of the tiled display. Tiles can e.g. be fastened to the support structure by means of bolts and nuts. Tolerances on the position of the holes through which the bolts have to engage can also contribute to the variation of the seams.

It is possible, that the beams of the support structure may not be perfectly aligned which will have an impact on the alignment of the tiles. This will also contribute to variation of the width of the seam along a side of the same tile.

While several solutions exist to align the tiles of a tiled display, they either require complex mechanical connections between tiles as in U.S. Pat. No. 8,384,616 B2 or are time consuming to install and adjust.

The regularity of the seam existing between display tiles in a tiled display is important to avoid visual artefacts. The regularity of the seam is a function of the alignment of the display tile. Techniques and apparatuses to align display tiles in tiled display are known in the art. For instance, U.S. Pat. No. 8,384,616 B2 describes how clips and receptacles are used to align adjacent display tiles with a high accuracy.

These and similar tile alignment techniques suppose that the LED themselves are properly aligned with the tile itself.

The LEDs are soldered to a LED board and the LED board is fastened to a carrier board. Aligning the LED board and the carrier board is usually done by means of one or more reference pin(s). The reference pin(s) is/are used to align the LED board with one or more references (e.g. a corner) of the carrier board. Unfortunately, there are tolerances on the position of the LEDs with respect to the LED board on which they are soldered and therefore, aligning the LED board perfectly with the carrier board by means of reference pins on the LED board does not mean that the LED themselves will be perfectly aligned with the carrier board. As a result, even if adjacent LED tiles are perfectly aligned, the relative position of the LEDs on different LED tiles may vary across a tiled display, thereby introducing visual artefacts.

Another problem not addressed by the clips and receptacles used in the prior art is the "z-coordinate" or position of the LED in a direction perpendicular to the plane of the LED board. Variation of the z position of the LED from tile to tile is the source of visual artefacts when the direction of a viewer's gaze is not perpendicular to the plane of a tiled display.

What is needed is a solution to adjust the distance between the top of the LEDs on the LED board and a reference, e.g. the back surface of the carrier board.

It is known in the art to adjust the distance between two objects fastened together with e.g. screws and bolts by adding washers between the two objects. The problem with this technique is that varying the distance between two objects is only possible by multiples of the thickness of the washers if off-the shelf washers are used or that the washers have to be machined for every LED board in function of the actual distance between the LED and the LED board. This is neither practical nor economical.

A similar problem exists with tiled liquid crystal display panels. As the size of the seam between panels decreases, it becomes more and more important to have adjacent panels as co-planar as possible.

At the same time that adjacent tiles must be aligned to higher degree of precision, it must be possible to easily service the panels. It is thus important to have fastening and alignment mechanisms that are compatible with the mechanism used to access the electronics supplying power, control and data signals to the liquid crystal panel.

Four general approaches can be found in the prior art that address servicing of tiled displays.

The first is the front access via display faces (see FIG. 1A).

This is a relatively new approach where the entire sign face hinges open to reveal the components. This design has initially appealed to many customers and manufacturers trying to find an innovative solution for service and repair. The main issue is panel door size limitation. Beyond a certain size, the weight of the panel can become a danger to the technician servicing the display. In particular if the display is mounted along a facade of a building several meters or even tens of meters above the ground.

The second approach is front access doors (see FIG. 1B). This approach is similar to the access face approach, but uses smaller doors over multiple sections of a sign. For safety reasons, it is better to limit the weight of each section to a few kilograms. In addition the hinge and the door movements require a minimum size of the seam around the door.

A third approach is Rear Access Doors. This approach cannot be applied to LED displays mounted on the façade of a building.

The fourth approach is front access LED Panels.

Individual LED modules or panels can be removed from the tiled display to access the components.

Examples of front access LED panels can be found in e.g. U.S. Pat. No. 7,055,271 B2 "Electronic display module having a four-point latching system for incorporation into an electronic sign and process".

When one of the tiles must be removed for inspection, maintenance and/or be replaced, the solution proposed in U.S. Pat. No. 7,055,271 makes use of a tool to trigger a release mechanism. When triggered, the release mechanism allows the tile to be moved outside of the plane of the tiled display either by rotation or translation. This gives direct access to the structure behind the display tile and in particular the fastening means with which the tile is fastened to the support structure of the tiled display. Whether it is two or four bars along which the display tile can slide or hinges to rotate the tile away from the tiled display as on FIG. 1B; the release mechanism adds to the weight of the display and is not compatible with display tiles that must be bent.

SUMMARY OF THE INVENTION

It is a purpose of the invention to provide improved means and methods to access display tiles in a tiled display.

In a first aspect, embodiments of the present invention relate to each display tile (500) of a tiled display being fastened to a support structure by means of at least one second support substructure (33) to which the display tile can be fastened, the at least one second support substructure (33) being characterized in that it is linked to the support structure by means of a first mechanism allowing movements of the display tile in a plane parallel to the nominal plane (XY) of the tiled display independently of the presence or absence of adjacent display tiles.

Embodiments of the present invention comprise support substructures each for fastening a display tile (500) to a support structure of a tiled display, adjacent display tiles in the tiled display being separated by a nominal seam, the second support substructure (33) being characterized in that it is linked to the support structure by means of a first mechanism allowing movements of each display tile in a plane parallel to the nominal plane (XY) of the tiled display to form a gap (G) between adjacent display tiles obtained by moving one or more display tiles from a first position (P1) to a second position (P2) and a second mechanism fixing the position of the second support substructure (33) in the second position, wherein the gap (G) is larger than the nominal seam.

Hence, the movement of the second support substructure (33) relatively to the support structure is meant to create a space or gap G between adjacent tiles. The gap G is larger than the nominal seam. By increasing the space or gap G between adjacent tiles, it is easier to access mechanisms positioned behind the display surface and that, when activated, will release a display tile (500) and allow it to either be replaced by another display tile and/or taken away for maintenance and/or storage. The gap G is obtained by moving one or more display tiles from a first position (P1) to a second position (P2).

The support structure can be an assembly or network of trusses. The support structure can be a wall; the wall can be fitted with trusses to which the support substructures can be fastened.

The first mechanism can be driven by e.g. a motor. Alternatively, the first mechanism can be driven by a crank or key operated by a human operator.

The first mechanism can include means to transform a rotary movement of a motor or manually operated crank into a translation of the first support substructure.

In particular, the first mechanism comprises a quadrant gear (312) and a pin (331). When rotated, the quadrant gear exerts a force on the second support substructure (33) by the intermediary of the pin (331).

The first mechanism can include one or more guiding means that will limit the direction and amplitude of the movement of the second support substructure (33).

The first mechanism can comprise a release mechanism. When it is released, the first mechanism cannot maintain the position of the first support substructure (33) on its own when a force is applied to the second support substructure (33) and/or the display tile (500) it supports.

In a further aspect of the invention, each display tile has one or more contact elements (510, 520, 530, and 540) with which it can interact mechanically with an adjacent display tile, in particular with a display tile positioned above it. This is particularly advantageous when no electrical motor is used to power the first mechanism. In particular, the contact elements can transmit a force from the lowest display tile in a column to all the other display tiles in the same column.

In a further aspect of the invention, a second mechanism can fix the position of the second support substructure (33). The second mechanism can fix the position of the second support substructure (33) by pushing a pin (332) fastened to the second support substructure (33). In particular the second mechanism can comprise a lever or hammer (316) that can take two positions: in a first position (H1)(see FIG. 7A), the hammer cannot prevent free movement of the pin (332); and in a second position (H2) (see FIG. 7B), the hammer prevent free movement of the pin (332). This is advantageous if a display tile must be kept in its second position (P2) without power dissipation (e.g. if a motor were used) or without the need for a continued human intervention (e.g. keeping applying a force on a mechanism).

In a further aspect of the invention, each display tile of the tiled display is fastened or mated to an intermediary third support substructure, the intermediary third support substructure being characterized in that it comprises a mechanism for moving the display tile outside of the display plane (XY).

It is another purpose of the invention to provide improved means and methods to align the display tiles in a tiled display. Such an alignment mechanism (32) can be used with first support substructures each for fastening a display tile (500) to a support structure of a tiled display, adjacent display tiles in the tiled display being separated by a nominal seam, the second support substructure (33) being characterized in that it is linked to the support structure by means of a first mechanism allowing movements of each display tile in a plane parallel to the nominal plane (XY) of the tiled display to form a gap (G) between adjacent display tiles obtained by moving one or more display tiles from a first position (P1) to a second position (P2) and a second mechanism fixing the position of the at least one support substructure (33) in the second position, wherein the gap (G) is larger than the nominal seam. The alignment mechanism can comprise an element with a central section, the central section having arms that are fastened to the central section, the arms radiating out from the central section.

For example, the arms can be positioned symmetrically around the central section and optionally two consecutive arms can be separated by an angle of 90°.

A hole in each of the arms can be adapted to receive a pin or screw to be fastened to the first support substructure.

A first element (258) together with the alignment mechanism (32) can be screwed onto the first fastening bolt (250) (see, for example, FIGS. 13A and 13B).

The means for displacement of the alignment mechanism in the direction parallel to the axis of the first fastening bolt (250) can be by rotation of the first fastening bolt (250).

The alignment mechanism (32) is preferably free to rotate around the first element (258) until a nut (253) is fastened.

The first fastening bolt (250) and the first element (258) can go through a spring loaded section (G252) that allows movement in orthogonal directions of the alignment mechanism (32) around the first element (258) within the limits of an opening (G251). The spring-loaded section (G252) in absence of other higher forces can enable self-centering of the alignment mechanism (32) around the first fastening bolt (250).

The alignment mechanism (32) can be tilted with respect to the first fastening bolt as long as the nut (253) is not fastened.

The alignment mechanism (32) can be moveable relative to the first fastening bolt (250) with all 6 degrees of freedom before being fixed relatively to the first fastening bolt.

The alignment mechanism (32) can be fastened relative to the first element (258) by a tightened nut (253) thus clamping discs (254, 255) in the central section (G256) and in between first element (258) and nut (253) through the opening (G251).

The first element (258) can be fastened on the bolt with a counter nut which is put on the bolt (250) directly below the first element (258).

Allowed translational and angular displacements of the first fastening bolt (250) within the opening (G251) by the spring loaded section (G252) can allow installed adjacent tiles not to have an increase of the seam around panels in spite of tolerances on the position of the bolt holes used to fasten the tiles.

A first support substructure (31) can be fastened to the alignment mechanism (32) with a single bolt (257) fastened in one of geometries (G211, G221, G231, G241).

The first support substructure (31) has a mating section (G120) corresponding to an arm (220) of the alignment mechanism (32).

The walls (G121 and G122) of the mating section on both sides of the arm (220) can be adapted to prevent rotation of the arm (220) around the axis of the single bolt (257).

Pin shaped geometries on each arm (G222 on 220) can fit each into a hole in extensions (130 and 140) of the first support substructure (31), thus positioning the first support substructure (31) in relation to the alignment mechanism (32) as well as in relation to any adjacent support structures.

The hole for the single bolt (257) is positioned in each of the arms (210, 220, 230, 240) within the pin shaped geometry (G221 within pin G222 in arm 220).

Bolt shaped geometries are fixed on the alignment mechanism (32) on top of the pins and to substitute the single bolts (257) with nuts.

In the case of a tiled display wall incorporating n*m display tiles (500) and (n+1)*(m+1) alignment mechanisms (32), at the outer circumference of the tiled display wall at least two out of the four holes (G211, G221, G231, G241) of each alignment mechanism (32) are not used to keep a support structure fixed.

The at least two out of the four holes are used when adding further support structures to the tiled display wall.

A tiled display can be connected to the support structure described above.

BRIEF DESCRIPTION OF THE FIGURES

FIG. 6A shows a plane view of the different support substructures and the first and second mechanisms. The view is as seen from the back of the first support substructure.

FIG. 6B shows a detail of an example of first mechanism when the second support substructure (33) and the display tile are in the first position P1.

FIG. 6C shows a detail of an example of first mechanism when the second support substructure (33) and the display tile are in the second position P2.

FIGS. 9A, 9B, 9C, 9D and 9E show details of a third mechanism to keep a display tile in a third position.

FIGS. 14A to 14C show view of the alignment mechanism and how it can induce translational and rotational adjustments.

ACRONYMS, DEFINITIONS AND NOTATIONS

Vectors will be denoted by an underlined symbol. For instance 1x, 1x, 1z or ex, ez will denote unit vectors of an orthonormal coordinate system x, y, z.

In particular, the acceleration of gravity g is such that g=−g 1y where g is the amplitude of the acceleration of gravity.

Align. To be in or come into precise adjustment or correct relative position.

Figure 1A:
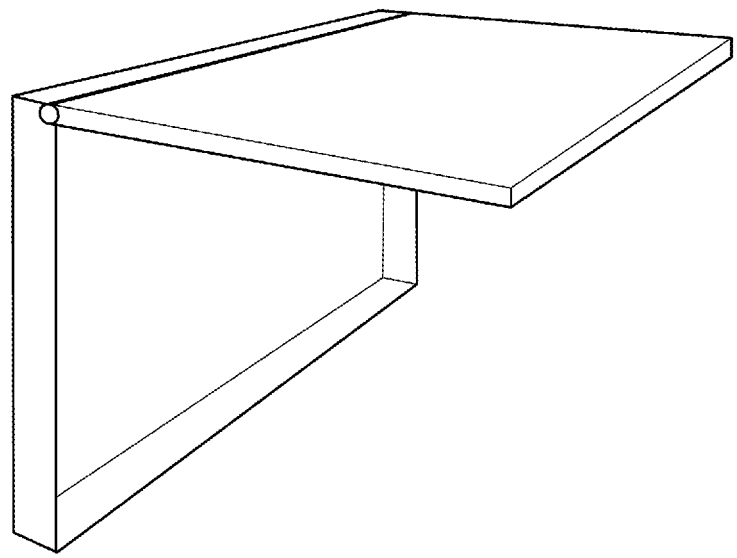
FIG. 1A shows an example of front access solution according to the art.
Figure 1B:
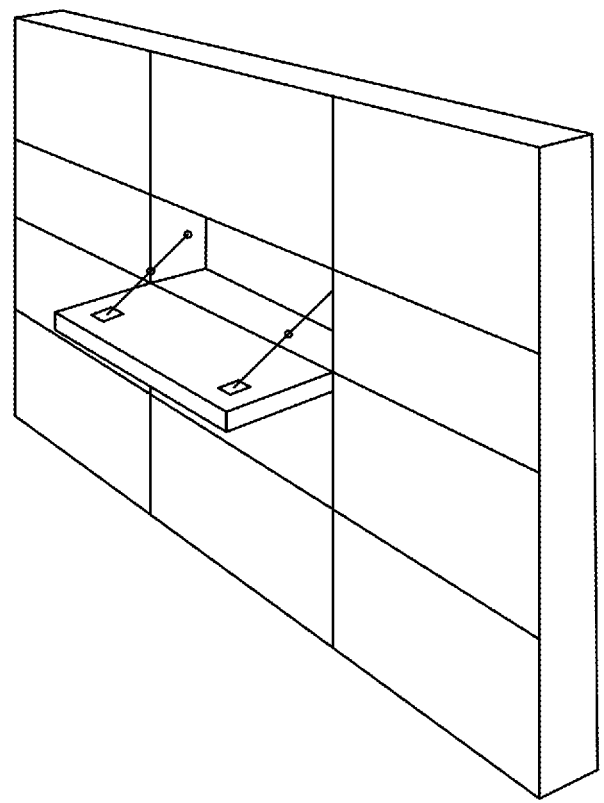
FIG. 1B shows a second example of front access solution according to the art.
Figure 2:
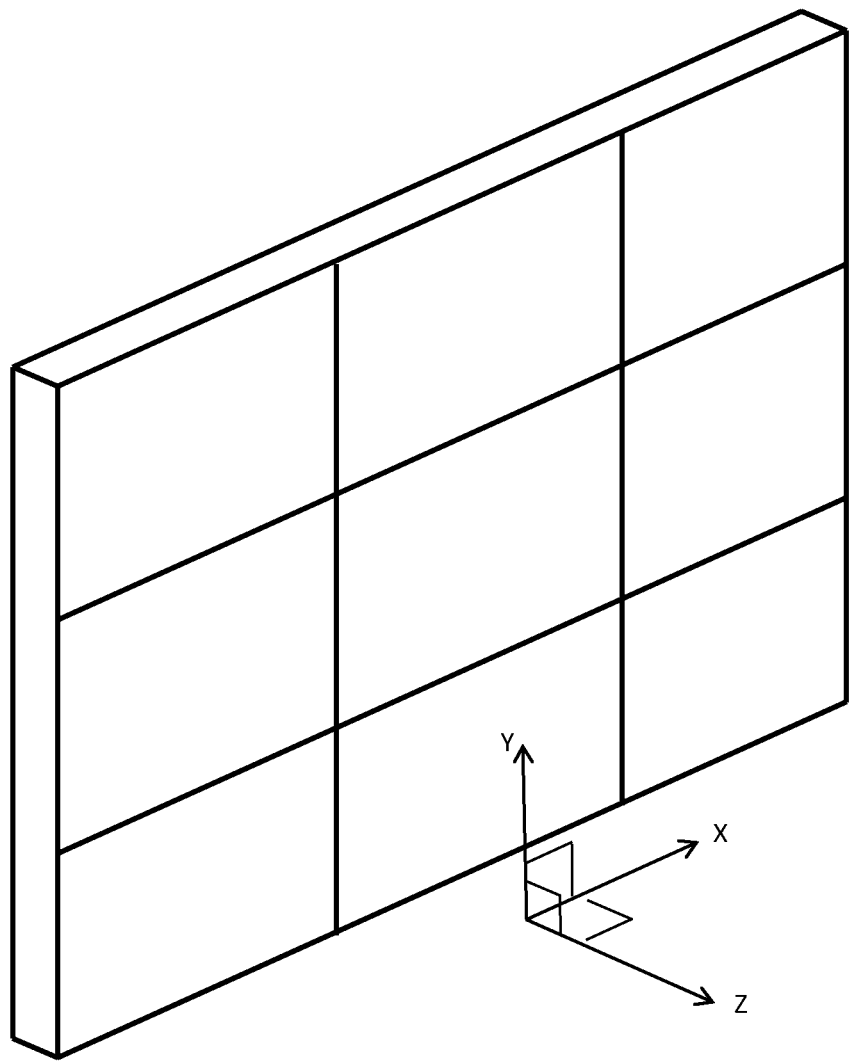
FIG. 2 shows the display surfaces of a tiled display with 9 display tiles. The axis X, Y and Z are orthonormal. The X and Y axis are in the nominal plane of the display surface.

Nominal. According to plan or expectations. In particular, the nominal display plane (or nominal plane of the tiled display) is the ideal planar surface across which images are to be displayed. The nominal display plane is expected to comprise the display surface of each of the display tiles of the tiled display. For instance, in the example of FIG. 2 and FIG. 4, the nominal display plane is the XY plane. The nominal display surface is the surface formed by the sum of the display surface of the tiles T1 to T9 (the tiles being symbolized by 9 rectangles on FIG. 4).

DETAILED DESCRIPTION OF THE INVENTION

Figure 3:
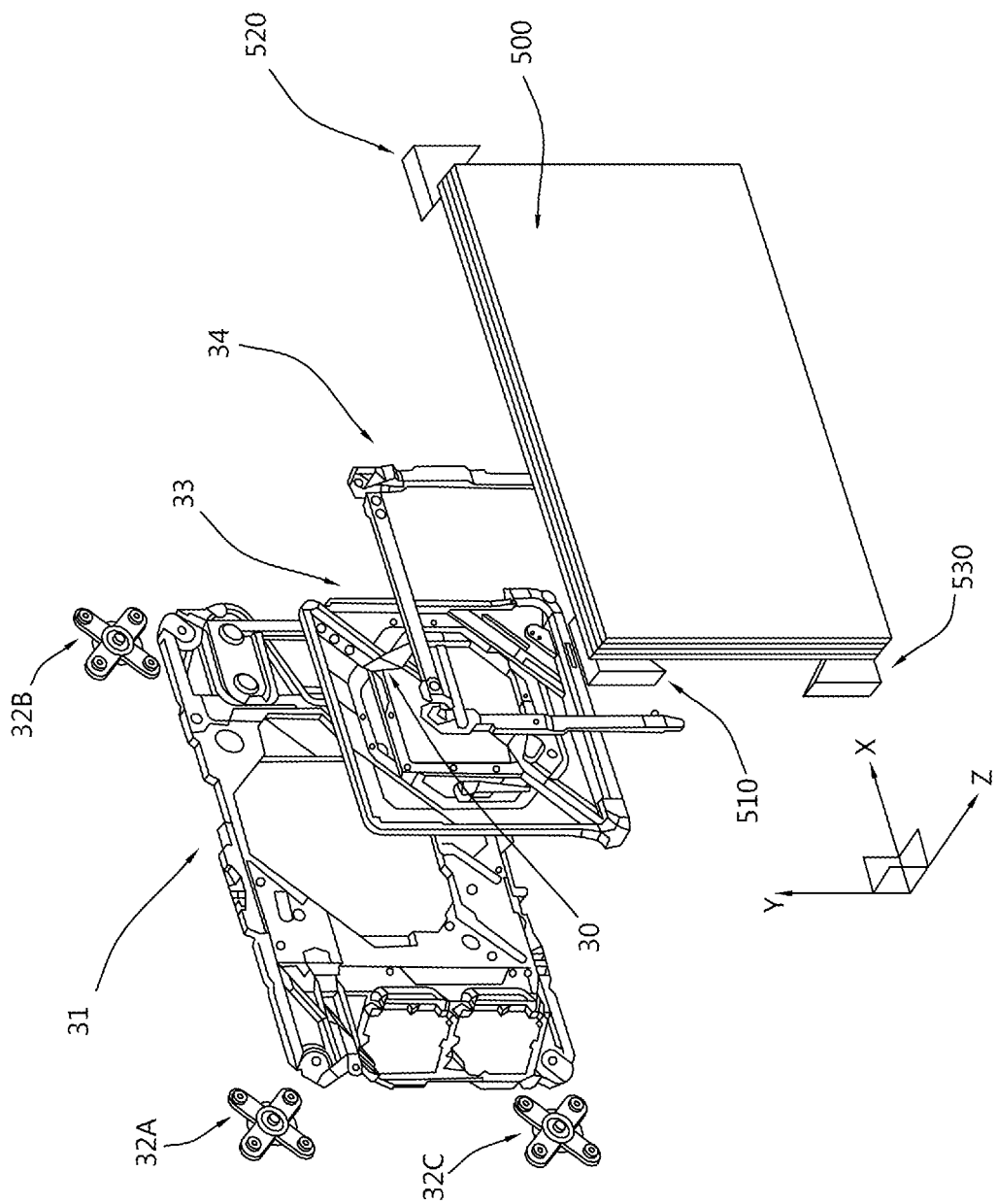
FIG. 3 shows an exploded view of the various support substructures according to the invention together with a display tile 500 in landscape orientation.

FIG. 3 shows an exploded view of the various support substructures according to the invention together with a display tile 500 in landscape orientation. The display tile can be aligned with other tiles of a tiled display and easily accessed for maintenance and repair.

A first support substructure 31 can be fastened to e.g. a wall (not shown on FIG. 3) and/or a network of trusses by the intermediary of an alignment mechanism (32A, 32B, 32C, 32D). The trusses can themselves be fastened to a wall or they can form a self-supporting structure. The alignment mechanism comprises cross shaped components 32A, 32B, 32C, 32D. The alignment mechanism allows the alignment of adjacent display tiles with respect to each other both in the X, Y and Z directions.

A second support substructure 33 is supported by the first support substructure 31. The second support substructure can move with respect to the first support substructure 31.

The movements of the second support substructure 33 with respect to the first support substructure can be limited in amplitude and direction as will later be described. In particular, the movement of the second support substructure is done in a direction parallel to the display plane XY. The movement of the second support substructure (33) relatively to the first support substructure (31) is meant to create a space or gap G between adjacent tiles, the gap G being larger than the nominal seam. By increasing the space or gap G between adjacent tiles, it is easier to access mechanisms positioned behind the display surface and that, when activated, will release a display tile (500) and allow it to either be replaced by another display tile and/or taken away for maintenance and/or storage.

The movement of the second support substructure can be controlled by a motor (rotary or linear). The motor can be controlled by control signals sent to e.g. the electronics usually associated with a display tile. Alternatively, the movement can be controlled by a hand crank as will be described in detail.

To further facilitate access to the fastening means that fasten a display tile to the support structure a third support substructure 34 can be used. The third support substructure 34 is supported by the second support substructure 33. The third support substructure can move with respect to the second support substructure 33.

The movement of the third support substructure has a component perpendicular to the display plane XY. The movement of the third support substructure with respect to the second support substructure can be a translation, a rotation or a combination of both.

A series of mechanism can be used to trigger and/or control the movements of the second and third substructures. These mechanisms are particularly relevant when no motor is used to modify the position of the display tiles.

In a first example of embodiment, it is assumed that the Y axis is parallel to the direction of the local field of gravity: $g = -g \cdot 1_y$.

A first mechanism can move a tile from a first position P1 (a nominal position) to a second position P2 (a position it has e.g. during maintenance).

A second mechanism can prevent a tile from returning to its first position P1. This can be advantageous when e.g. accessing the mechanisms to release a display tile requires a gap between that display tile and all the adjacent display tiles.

A third mechanism is used to control the movement of a tile and to position it in a third position P3 or service position.

We will describe those mechanisms and how they operate in the context of a tiled display comprising 9 display tiles (T1, T2, T3, . . . , T9) assembled in 3 rows of 3 adjacent display tiles.

Figure 4:
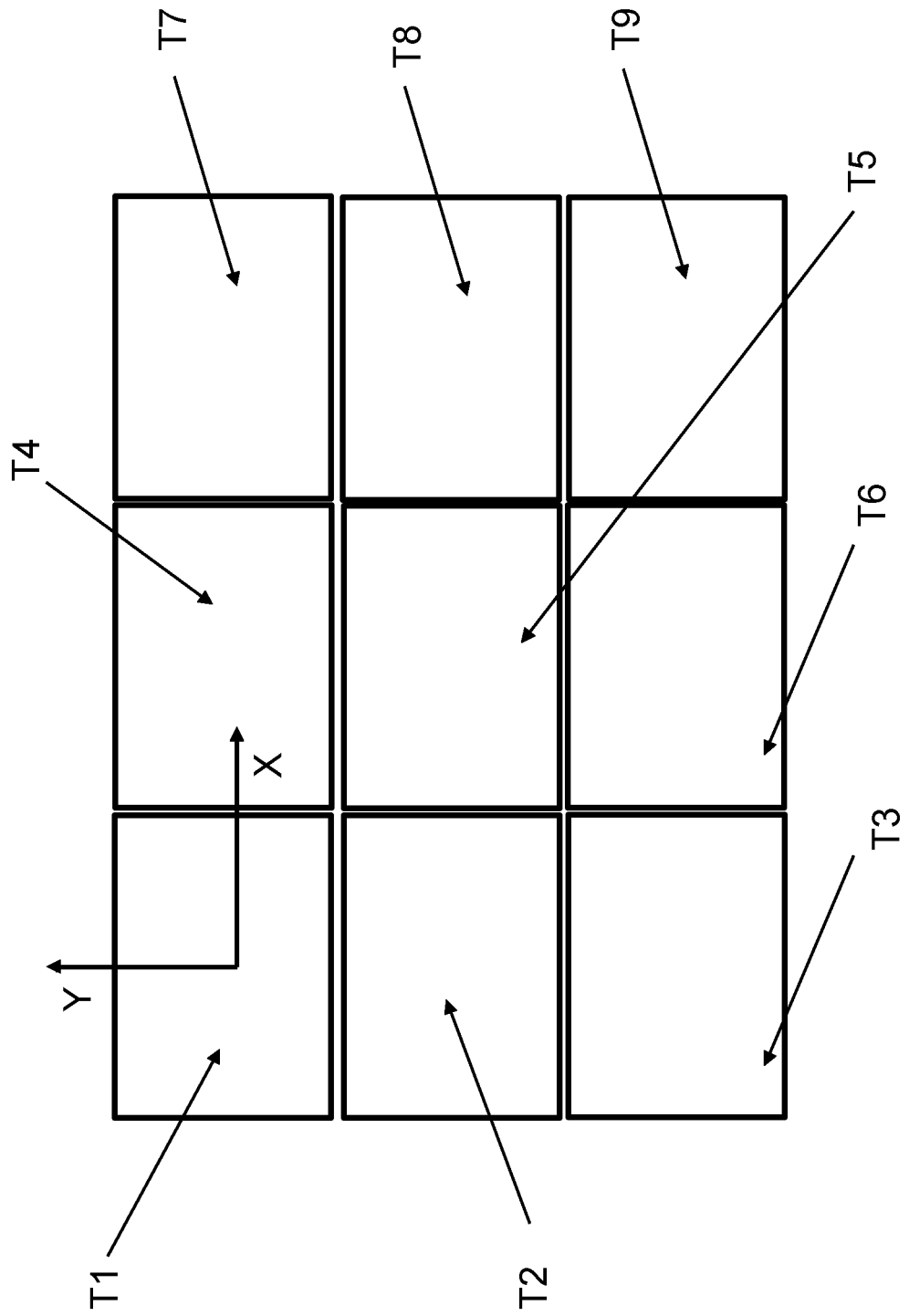
FIG. 4 shows the relative position of the 9 display tiles (example of 3 rows and 3 columns of display tiles) in normal use (all tiles are in their first position P1).

FIG. 4 shows the relative position of the 9 display tiles (example of 3 rows and 3 columns of display tiles) in normal use. The nominal position of the display panels or tiles T1 to T9 is in the same plane X-Y as illustrated. The distance between two display tiles is the nominal seam separating the tiles of the tiled display. The nominal seam can for example be chosen between 0 mm and 2 mm or more.

Figure 5:
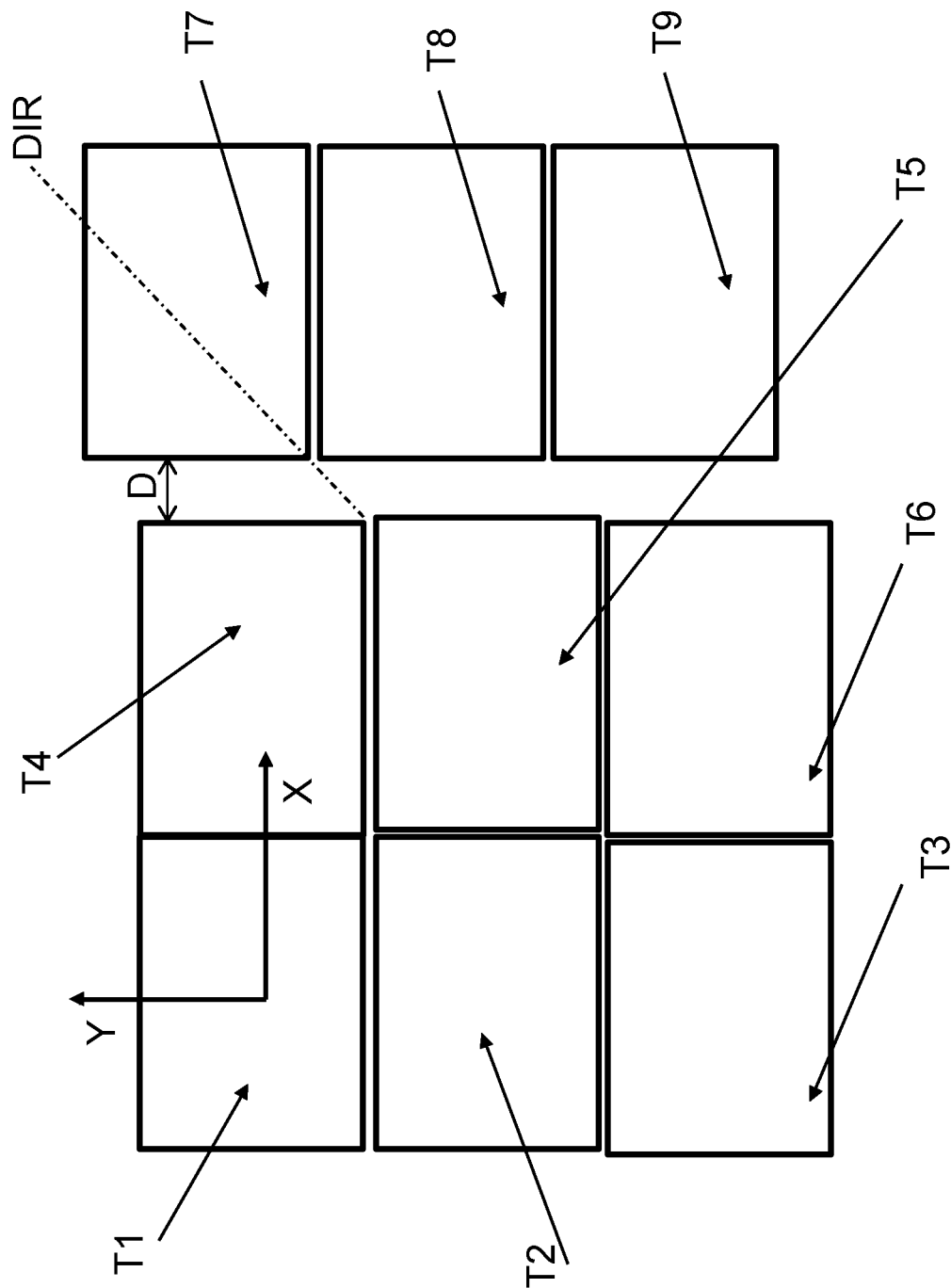
FIG. 5 shows the relative position of the 9 display tiles (example of 3 rows and 3 columns of display tiles) when the tiles (T7, T8, T9) of the third column have been moved to their second position P2.

To access the support and alignment mechanism that will allow to fasten/unfasten a display tile to the tiled display, a first mechanism is activated and triggers a first movement positioning the display tiles T7, T8, and T9 as shown in FIG. 5. The position shown in FIG. 8 can be reached by means of a translation along a direction DIR (which makes e.g. an angle of 45° with respect to a principal direction of the display) away from the nominal position.

The first movement can be common to all tiles in the same column. In the example of FIGS. 4 and 5, the tiles T7, T8 and T9 move together. This can for instance be achieved by driving several tiles of a column simultaneously or by applying a force on the lowest tile of the column and the lower tile will transmit the force to the other tiles of the column e.g. by pushing on contact elements (510, 520, 530, 540), which are illustrated in figure (contact element 540 is hidden by display tile 500). Elements 510, 520, 530, 540 are installed on the display tile 500 so as to contact the surfaces of neighboring contact elements of adjacent display tiles. They slightly protrude the circumference of the display itself. The size of this protrusion defines the width of the seam between adjacent tiles and is preferably below one mm. In particular, the size of the protrusion is the same for all contact surfaces (i.e. the sides of a contact element that contacts the corresponding sides of a neighboring contact element). In a particular case, when the contact surfaces do not protrude but are flush with the perimeter (or outer limits) of the display itself, the seam between adjacent tiles is absent.

FIGS. 6A, B and C illustrate an example of mechanism to move a tile T9 from the position it has in FIG. 4 to the position it has in FIG. 5.

FIG. 6A shows a plane view of the different support substructures and the first and second mechanisms. The view is as seen from the back of the first support substructure.

As seen on FIG. 6A, the first mechanism contains a gearwheel 311. The gearwheel 311 can rotate around an axis of rotation Ax1 that is fixed with respect to the first support substructure 31. The axis of rotation Ax1 is preferably perpendicular to the X-Y-plane (the plane of the display surface). The gearwheel 311 is linked mechanically to a quadrant gear 312. The quadrant gear 312 has an axis of rotation Ax2 that is fixed with respect to the first support substructure 31. When the gearwheel is rotated it rotates the quadrant gear 312.

The quadrant gear 312 can interact with the second support substructure 33 by the intermediary of e.g. a pin 331 fastened to the second support substructure 33 as is illustrated on FIGS. 6B and 6C. The position of the pin 331 relative to the second support substructure is constrained by e.g. a groove 313 in the second support substructure 33 (as exemplified on FIGS. 6B and 6C. The groove 313 imposes a movement along the direction DIR and can limit the maximum amplitude of the movement of the second support substructure. Alternatively, as exemplified on FIG. 6A, movements of the second support substructure 33 with respect to the first support substructure can be constrained by guiding rails and ball bearings. The ball bearings 3150 and 3151 are fastened to the first support substructure 31 and engage in a guide or opening 3152 or 3153. Other guiding mechanisms are possible.

The pin 331 engages in a notch 3121 in quadrant gear 312. When quadrant gear 312 rotates (e.g. from its initial position on FIG. 6A or 6B to a position as represented on FIG. 6C), it pushes against pin 331. Pin 331 being fastened to the second support substructure 33, any displacement of pin 331 is accompanied by a displacement Δ of the entire second support substructure 33. The displacement Δ is done parallel to the direction Dir.

The gearwheel 311 is in contact with a locking element 315, of which the position is fixed with respect to the first support substructure 31 to prevent element 33 to drop back along the direction DIR. A pin 314 (part of the locking mechanism 315) can release the quadrant gear when pushed. The quadrant gear is then free to return to its resting position as in FIGS. 6A and 6B.

The gearwheel can be driven by e.g. a hand crank, a key or a motor (like e.g. an electric motor). The locking element 315 and release pin 314 are particularly useful when the gearwheel is driven by a hand crank. With a high enough gear ratio, an electric motor can easily generate enough torque to keep a display tile in the second position P2 without excessively dissipating power and without the help of the locking element.

An advantage of using an electrical motor to change the position of a display tile is that it can limit the number of mechanisms required to access a display tile. In particular, when using one electrical motor per display tile, the second and third mechanisms described further below may not necessarily be needed although they may still be used advantageously to e.g. make the use of less powerful motors possible and/or decrease the power dissipation.

As the second support substructure of tile T9 moves upwards, it pushes on the second support substructure of tile T8 which in turns moves upwards. As it moves upwards, the second support substructure of tile T8 pushes on the second support substructure of the tile T7 which in turn move upwards along the direction DIR. As described earlier, the force pushing a tile upwards can be transmitted from a lower tile to a higher tile by means of contact elements (510, 520, 530 and 540 in the example of FIG. 3).

The first mechanism can be used to create a first gap between two columns of tiles as seen on FIG. 5 (T4 to T6 and T7 to T9). In some embodiments of the invention, this first gap may be sufficient to access a release mechanism that will give access the fastening means used to fasten a display tile to the support structure of the tiled display. The space D between two columns of tiles (T4, T5, T6) and (T7, T8, T9) is larger than the nominal seam. D can be as large as e.g. 10 or 15 cm and give access to e.g. a lever or a switch which when activated will trigger a mechanism that will push a display tile outside of the nominal display plane. For instance, a linear motor can push a tile outside of the nominal display plane along a direction perpendicular to the nominal display plane.

Figure 8:
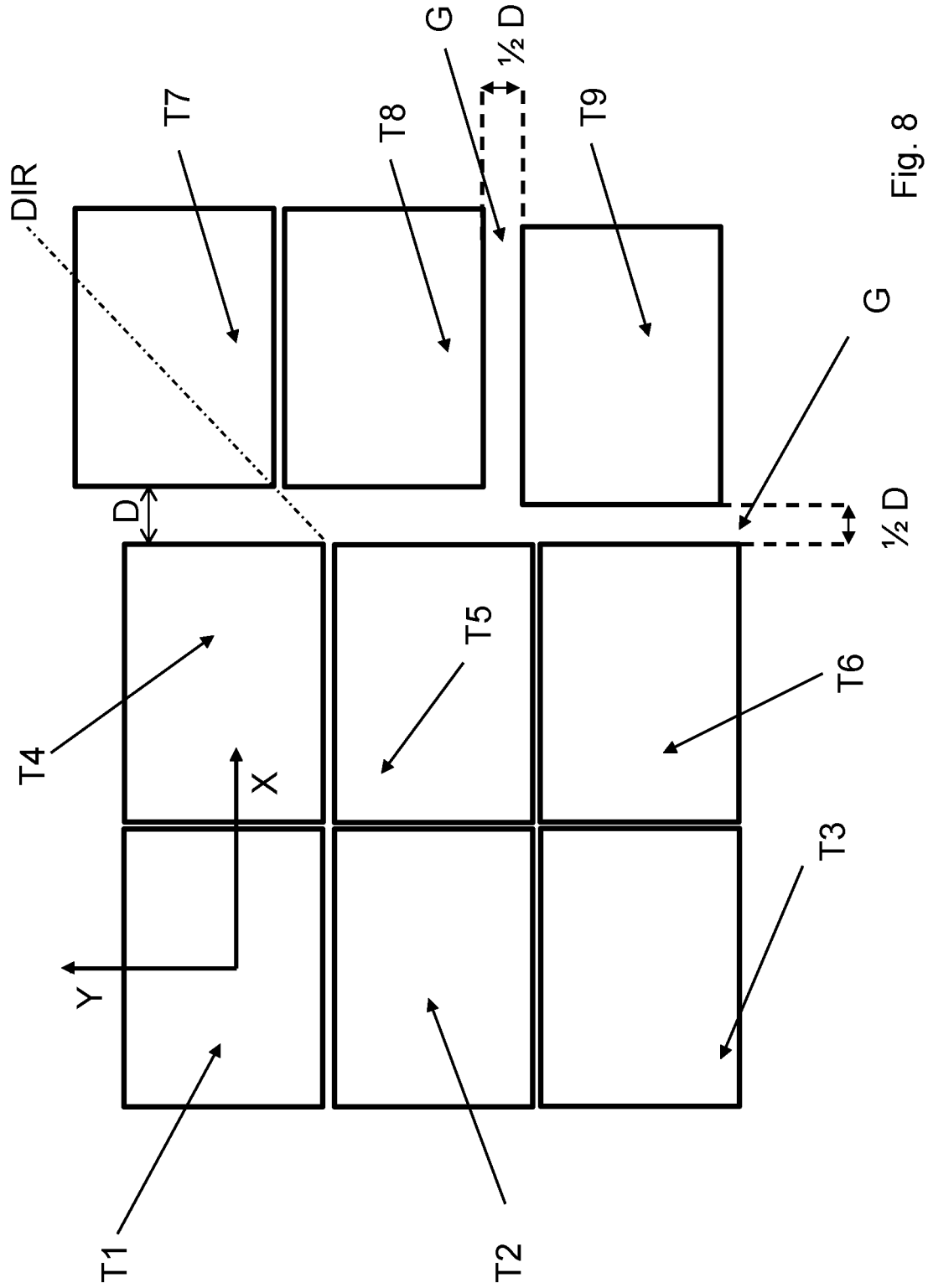
FIG. 8 shows the relative position of display tiles when a tile (T9) is in a third position (P3).

It may be advantageous to generate a gap G all around the display tile that must be accessed for maintenance (as is e.g. the case for tile T9 on FIG. 8). This can be advantageous if e.g. the release mechanism requires a movement outside of the nominal display plane that requires a gap along a horizontal side of a display tile, or if no electric motors can be used to push the tile outside of the display plane etc. In other words, a gap all around the display tile gives more freedom to use different release mechanisms, different connection means to connect a display tile to power and control signals etc.

To describe how to access the release mechanism of a display tile (500) in those cases, let us consider the example of tile T9.

T9 can be separated from tile T8 by letting it drop back, in direction of its initial or first position P1. The desired position for tile T9 can for instance be as illustrated on FIG. 8. This position is a third fixed position P3 that a tile can assume within the display plane of the tiled display. Alternatively, T9 can move (or be moved) to its initial position P1.

In order to keep the tile T8 and/or T7 in the position they have in FIG. 5 (T8 and T7 are in their second position P2 in FIG. 5) if the tile T9 undergoes a second movement back towards its initial position on FIG. 4, a second mechanism is required. Indeed, if the force used to push a tile upwards is transmitted by means of e.g. contact elements (510, 520, 530 and 540), if tile T9 moves down, the tile T8 and T7 will follow unless another force keeps them in place. The purpose of this second mechanism is to be able to create a gap between two adjacent display tiles in the same column (i.e. between a display tile and the adjacent display tile above it).

Figure 7A:
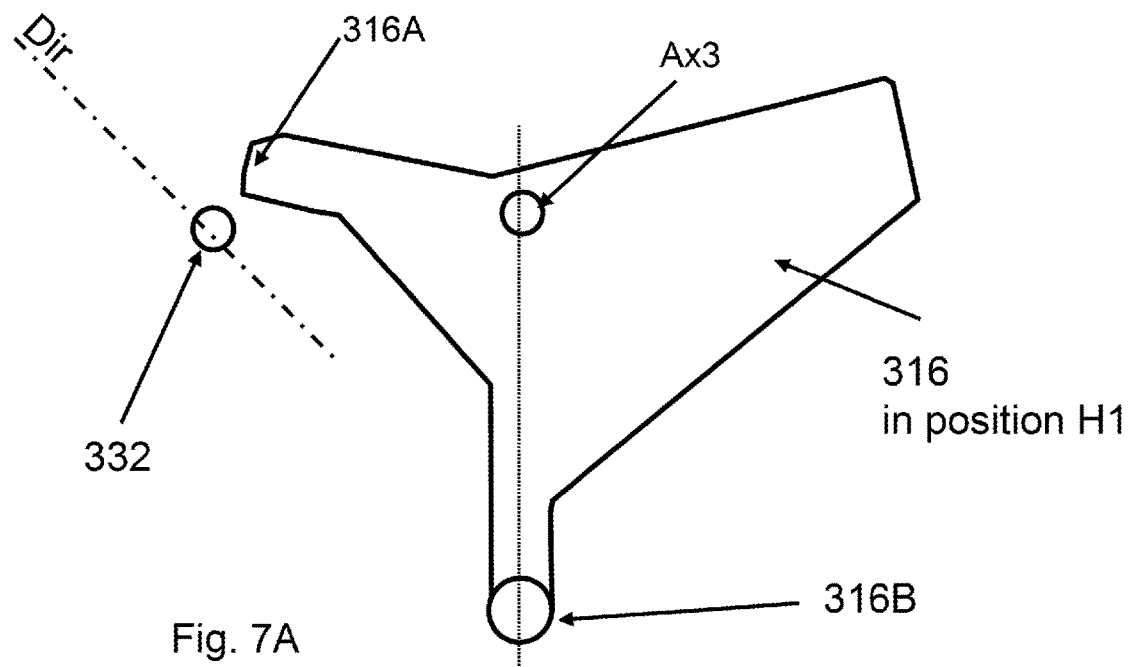
FIGS. 7A and 7B show details of a second mechanism in its first and second position.
Figure 7B:
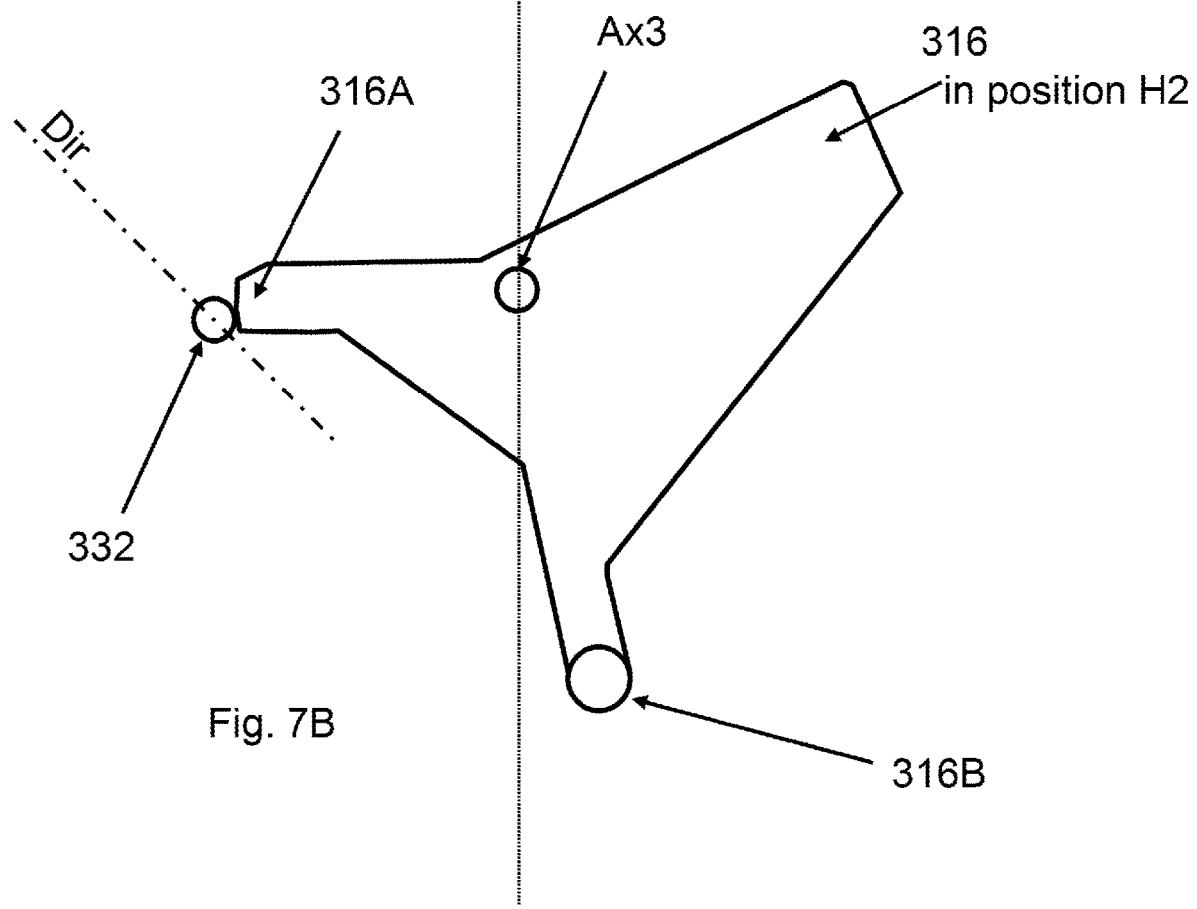

An example of such a mechanism is illustrated on FIG. 6A, FIG. 7A and FIG. 7B.

The mechanism comprises a hammer 316 that can rotate around an axis Ax3. The axis Ax3 can for instance be perpendicular to the display plane XY and have a fixed position with respect to the first support substructure 31.

In a first position (H1) (illustrated on FIGS. 6A and 7A), the hammer 316 allows the second support substructure 33 to move along the direction DIR. In particular, the head of the hammer 316A is not in the way of a pin 332 fastened to the second substructure.

In a second position H2 (illustrated on FIG. 7B), the head 316A of the hammer 316 is close to the position that the pin 332 can occupy along the direction Dir when the second support substructure 33 is moving back to its initial position (the position of support substructure 33 that corresponds to the position of the display tile on FIG. 4). If the quadrant gear is released, gravity will be free to bring the second support substructure back to its lowest position but the head 316A of the hammer 316 exerts a force on the second support substructure 33 by the intermediary of pin 332 thereby keeping the second support substructure 33 in a raised position.

The position of the hammer can be changed e.g. by exerting a force on a lever or arm 316B. The hammer 316, its head 316A and the lever 316B can be cast as a single solid mechanical element.

A force can be exerted on the lever 316B by a notch 317 in a translating or gliding bar or plate 318 seen on FIG. 6A. As illustrated on FIG. 6A, the translating plate 318 and notch 317 of a tile e.g. T9 apply a force on the lever of the hammer 316 associated with the tile right above e.g. tile T8

Figure 11:
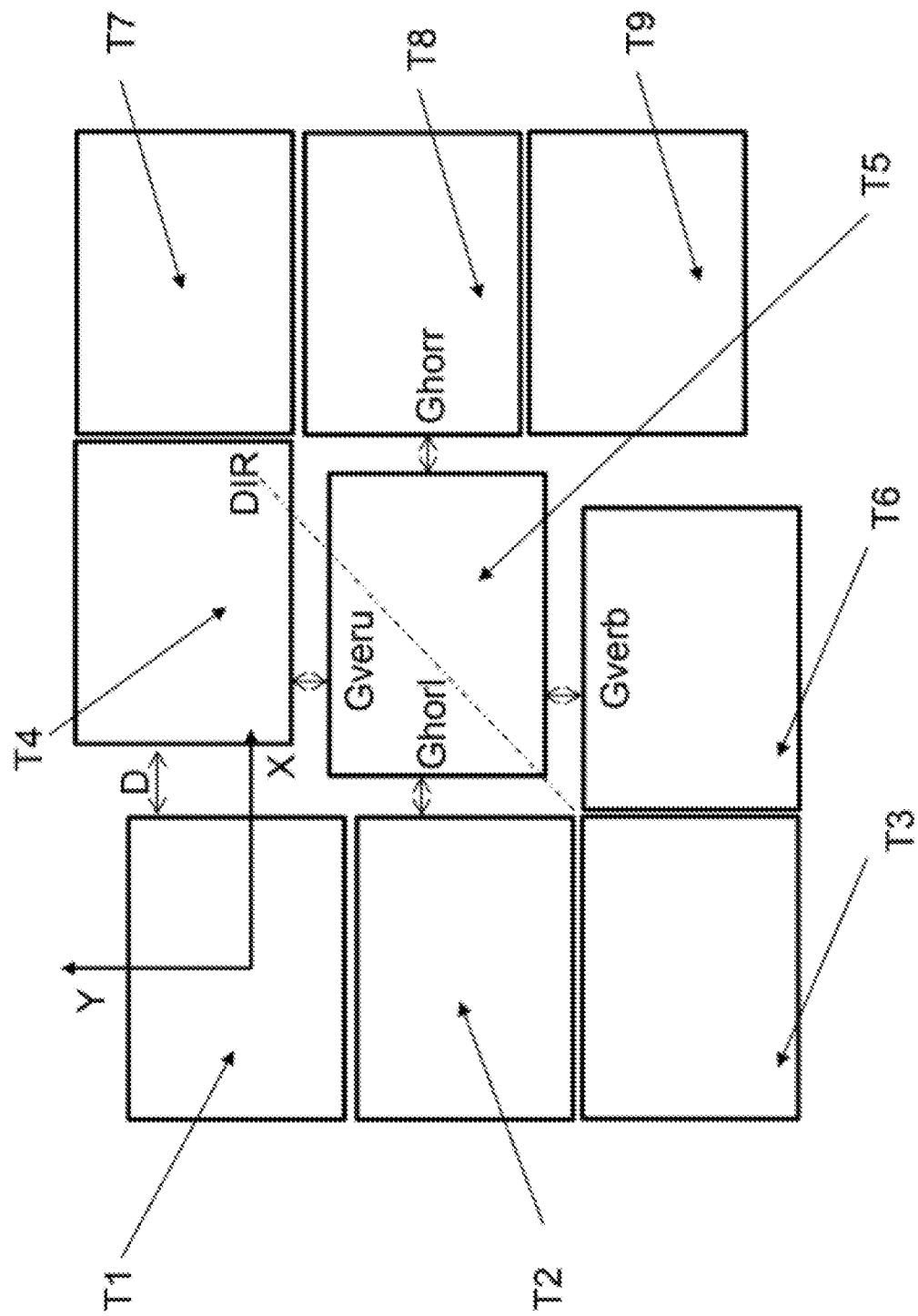
FIG. 11 shows to relative positions of the tiles of a 3λ3 tiled display when a gap is created around the central tile (T5).

In some cases, it can be advantageous to prevent a tile like T9 to return entirely to its original position (P1) and fix the tile in an intermediary or third position P3 between the first position P1 and the second position P2. FIG. 8 gives an example where tile T9 is maintained at a third position P3 mid-way between P1 and P2. FIG. 11 shows an example where tile T5 is maintained at a third position P3 while tiles T4, T7, T8 and T9 have been moved to their second position (with the help of a first mechanism) and T6 has been returned to its first position. This creates a gap all around the display tile T5. This gives additional freedom to design a release mechanism that will bring a display tile, T5 in this case, out of the plane of the display plane when the tile T5 must e.g. be replaced.

Keeping a tile like T9 in a third position P3 can be achieved e.g. by means of a third mechanism is required to prevent the tile T9 to return to its lowest position P1. To service the tile T9, one may want to be able to access it all around as seen on FIG. 8 (depending on the mechanism used to take display tile out the display plane).

An example of third mechanism is given on FIG. 9A. FIG. 9A shows the configuration of the mechanism when the tile e.g. T9 is in its nominal position (as in FIG. 4).

A plate 901 is fastened to the second support substructure 33. An opening 903 in the plate 901 determine a set of possible positions of the plate 901 with respect to the first support substructure 31. Alternatively, the opening 903 can be realized directly in the second substructure.

A pin 902 is fastened to a plate 318. The plate 318 can move along a single direction Dir 2 (left to right or right to left on FIG. 9A) with respect to the first support substructure. In the example of FIG. 9A and FIG. 3, the direction Dir 2 is parallel to the lower and upper side of a tile e.g. T9 which corresponds to the horizontal direction (perpendicular to the local field of gravity).

The plate 318 can glide in guides formed in or fastened to the first support substructure 31.

The opening 903 can consist of two parts 903A and 903B (separated by a dashed line on FIG. 9A). If the pin 902 occupies a first position with respect to the first support substructure 31, the second support substructure can move farther away along the direction Dir (the amplitude of the movement can be as large as the distance between points A and B on FIG. 9A).

FIG. 9A shows the relative position of the plate 901 and the pin 902 when the tile (e.g. tile T8) is in its nominal position (i.e. in normal use as on FIG. 4).

Figure 9B:
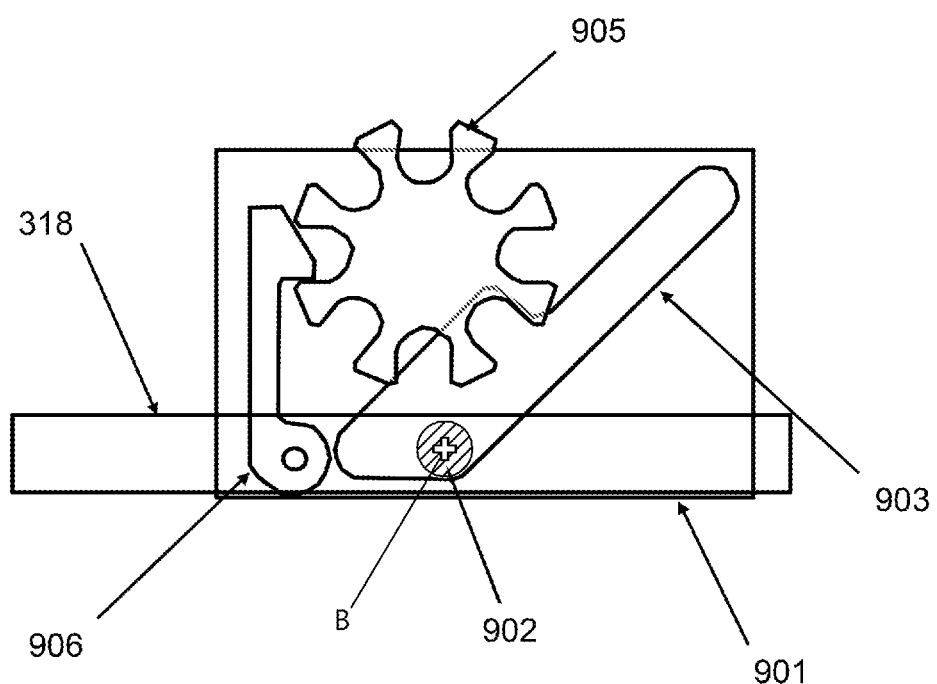

FIG. 9B shows the relative position of the plate 901 and the pin 902 when the tile (e.g. tile T8) has been raised as described earlier (i.e. as on FIG. 5).

Figure 9C:
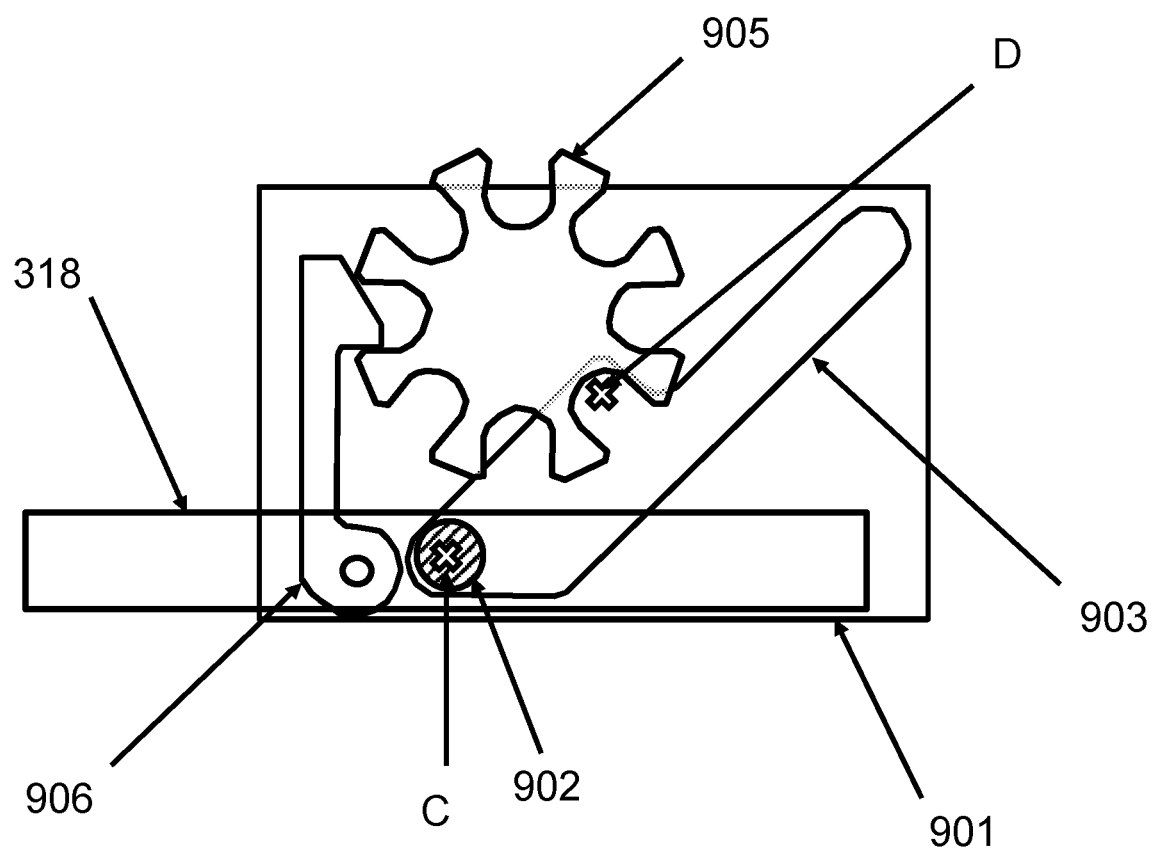
Figure 9D:
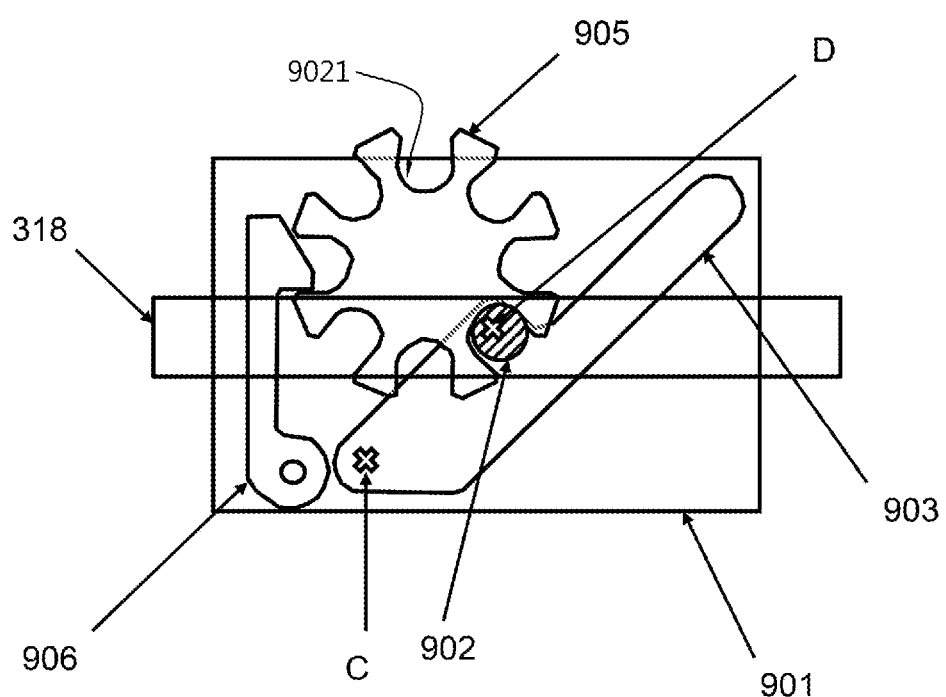

If the pin 902 occupies a position on the second part 903B of opening 903, the maximum amplitude of the movement for the second support substructure can be limited to the distance between points C and D on FIG. 9C. When the position of pin 902 is at point D (as on FIG. 9D) the plate 901 cannot glide further back and the tile (e.g. T9) remains at an intermediate position as in FIG. 8.

Figure 9E:
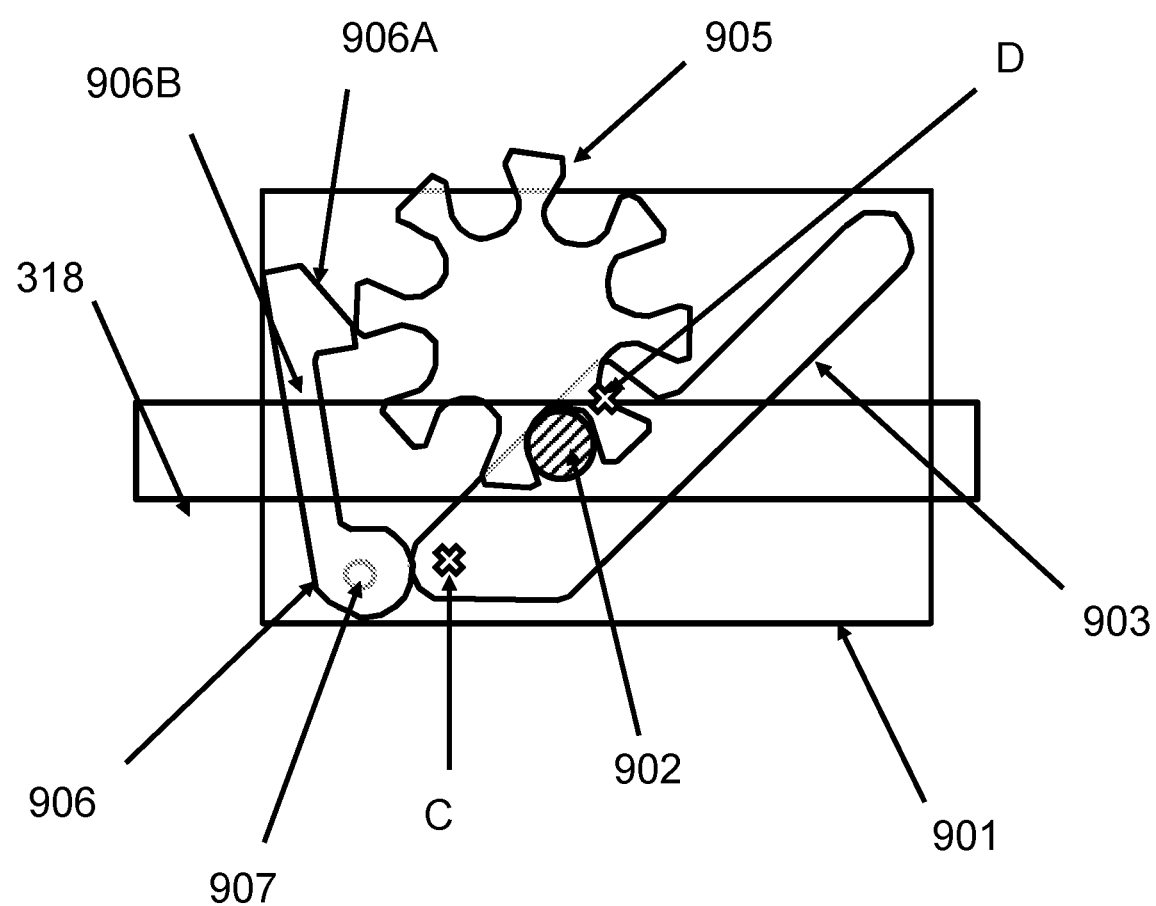

Once the pin 902 is in position C and the tile e.g. T9 falls back towards its original position P1, the pin 902 will be pushed into the space 9021 between two teeth of the cogwheel 905. The cogwheel 905 can rotate in a single direction. As can be seen on FIGS. 9C and 9D, the tip of hook 906 can be dislodged from the space between two teeth of the cogwheel only when the cogwheel rotates in a first direction When the cogwheel turn in the first direction, one of the teeth (upstream) of the hook can push on a slanted surface of the hook and dislodge the hook. In the opposite direction, the hook remains stuck in the space between two adjacent teeth, thereby preventing the wheel from actually turning. FIG. 9E shows how the hook can disengage from the cogwheel 905 while the plate 901 moves down under the action of gravity. As the plate 901 drops, the pin 902 enters the space between two teeth of the cogwheel 905 and by pushing on the side of a tooth, it makes the cogwheel move.

The position of pin 902 relative to the plate 901 can be switched from B (FIG. 9B) to C (FIG. 9C) by exerting a force on the plate 318 (the plate 318 glides from right to left between FIGS. 9B and 9C).

The movement of plate 318 (associated to a first tile e.g. T9) can be coupled to the movement of the lever used to change the position of the hammer associated to a second tile (e.g. T8). If the force exerted on the tile T9 is released, T9 will position itself as in FIG. 8 while T8 will keep its position (its motion being blocked by the hammer associated with tile T8). This coupling can be seen in the top right corner of FIG. 6A.

When an operator wishes to attend to e.g. tile T9, the operator can access the plate or lever 318 in the space between tile T9 and tile T6. By applying a force on the plate 318, the operator moves the pin 902 from a position B corresponding to FIG. 9B to position C on FIG. 9C. At the same time, the lever 318 modifies the configuration of the hammer 316 associated with the tile T8.

By releasing the locking element 315 of tile T9, the quadrant gear 312 under the weight of the tile T9 is pushed back towards its original position until the pin 902 reaches position D and presses against the upper boundary of the opening 903B.

At that time, the configuration of the tiled display is as seen on FIG. 8.

There is now a space (½ D) between tile T8 and T9 that is larger than the original seam. The operator can access another lever to release the third support substructure 34. The third support substructure 34 is seen on FIGS. 3, 6A, 10 and 11.

Figure 10A:
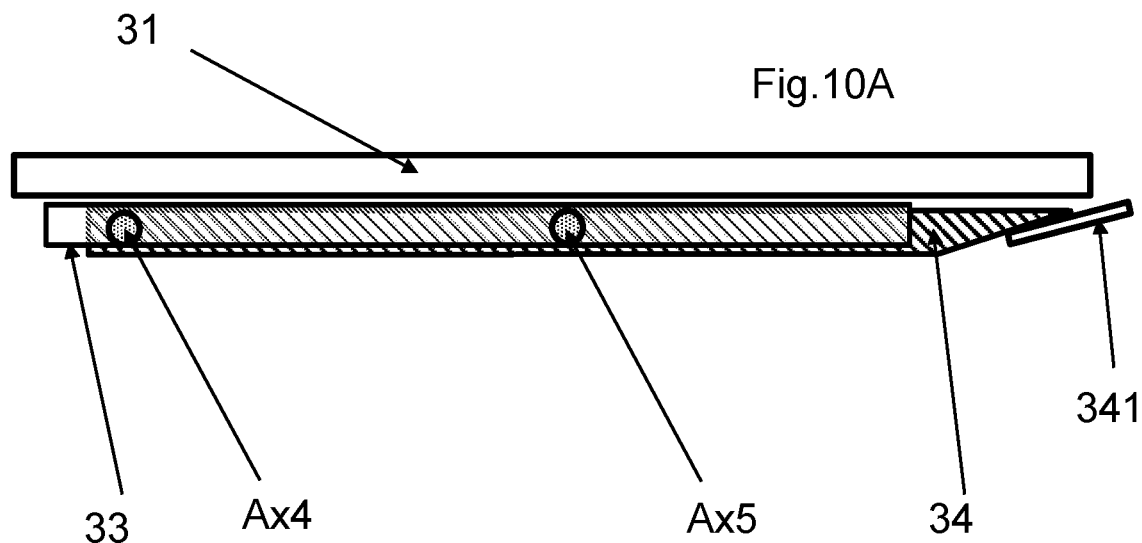
FIGS. 10A, 10B, 10C and 10D show a cross section of the mechanism to move the tile out of the display plane X-Y in different positions.
Figure 10B:
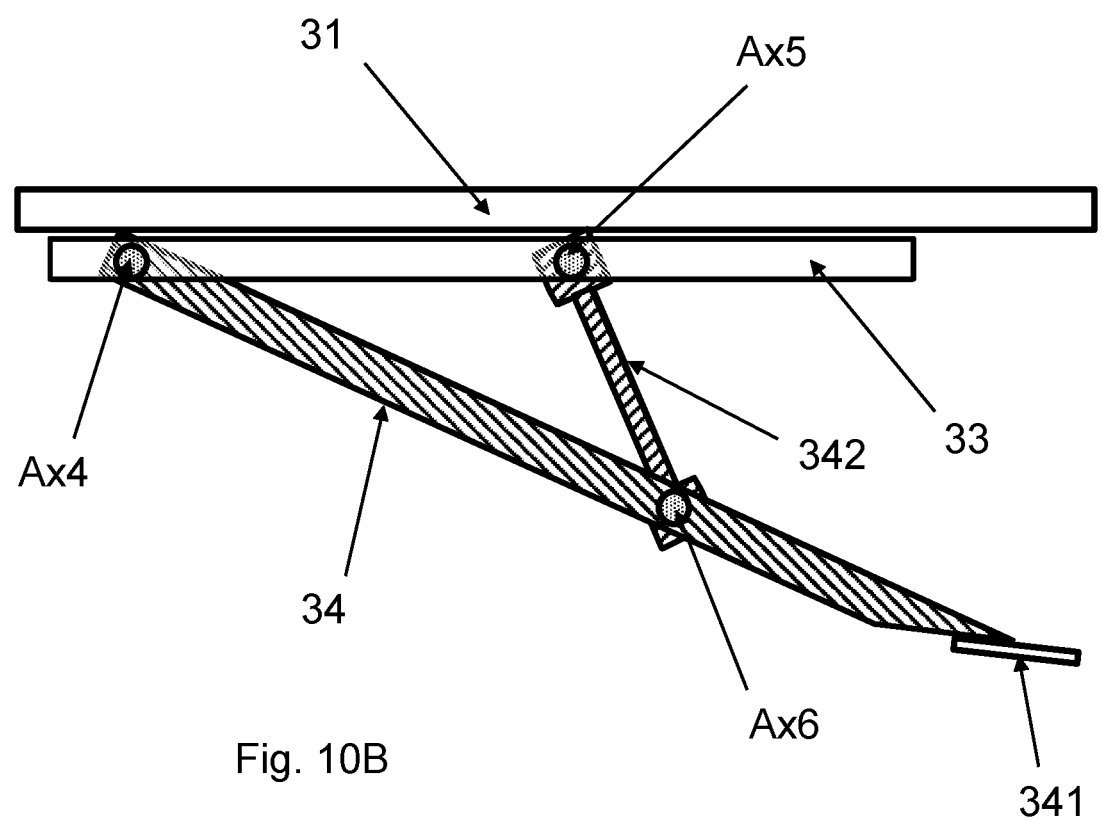

When all tiles are in a position as illustrated in FIG. 8, elements of the mechanism behind the display tile T9 are accessible through the gap G both on the vertical and horizontal sides of the tile T9 (thereby giving more freedom to design the mechanism releasing a display tile). FIG. 10A shows a cross section of the mechanism to move the tile out of the display plane X-Y. Element 341 can e.g. be a clip that can be reached through the gap between tile T8 and T9. There can be more than one element 341 along the X direction. When element 341 is activated, it releases the third support substructure 34 that can rotate around an axis Ax4 as illustrated on FIG. 10B. The axis Ax4 is parallel to the display plane. In the example being described, the axis of rotation Ax4 is parallel to the X axis of the coordinate system represented on e.g. FIG. 3. The display tile 500 (not shown in FIG. 10A or 10B) can be hung to the third support substructure 34 along an axis of rotation parallel to Ax4. When the third support substructure 34 rotates out of the display plane, under the action of the weight of the tile 500, the display tile 500 can remain parallel to the display plane in a resting position as illustrated on FIG. 10C. The display tile can e.g. hang to an axis Ax7 fastened to the third support substructure 34. The axis Ax7 is parallel to the axis Ax4. The amplitude of the rotation around the axis Ax4, can be limited e.g. by an arm 342. The arm 342 has a first extremity that can rotate around a first axis of rotation Ax5 that is fixed to the second support substructure 33. The arm 342 has a second extremity that can rotate around a second axis of rotation Ax6 that is fixed to the third support substructure 34. In the example of FIGS. 10A and 10B, the axis of rotation Ax5 and Ax6 are parallel to the axis of rotation Ax4. The length of the arm 342 and the position of the axis Ax5 and Ax6 determine the maximum amplitude of the rotation of the third support substructure 34 around the axis Ax4. Other mechanisms are possible to limit the amplitude of the rotation of the third support substructure 34 around axis Ax4.

Figure 10C:
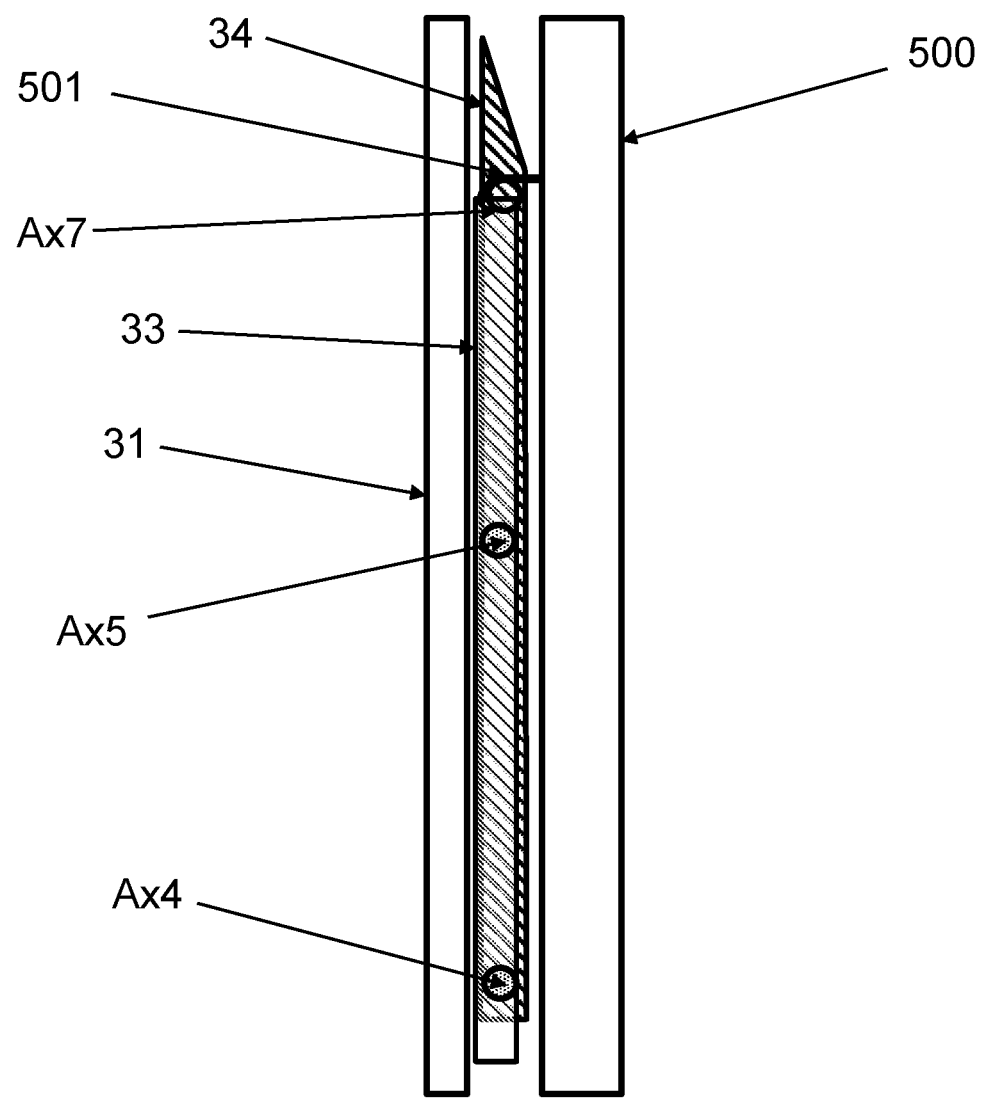
Figure 10D:
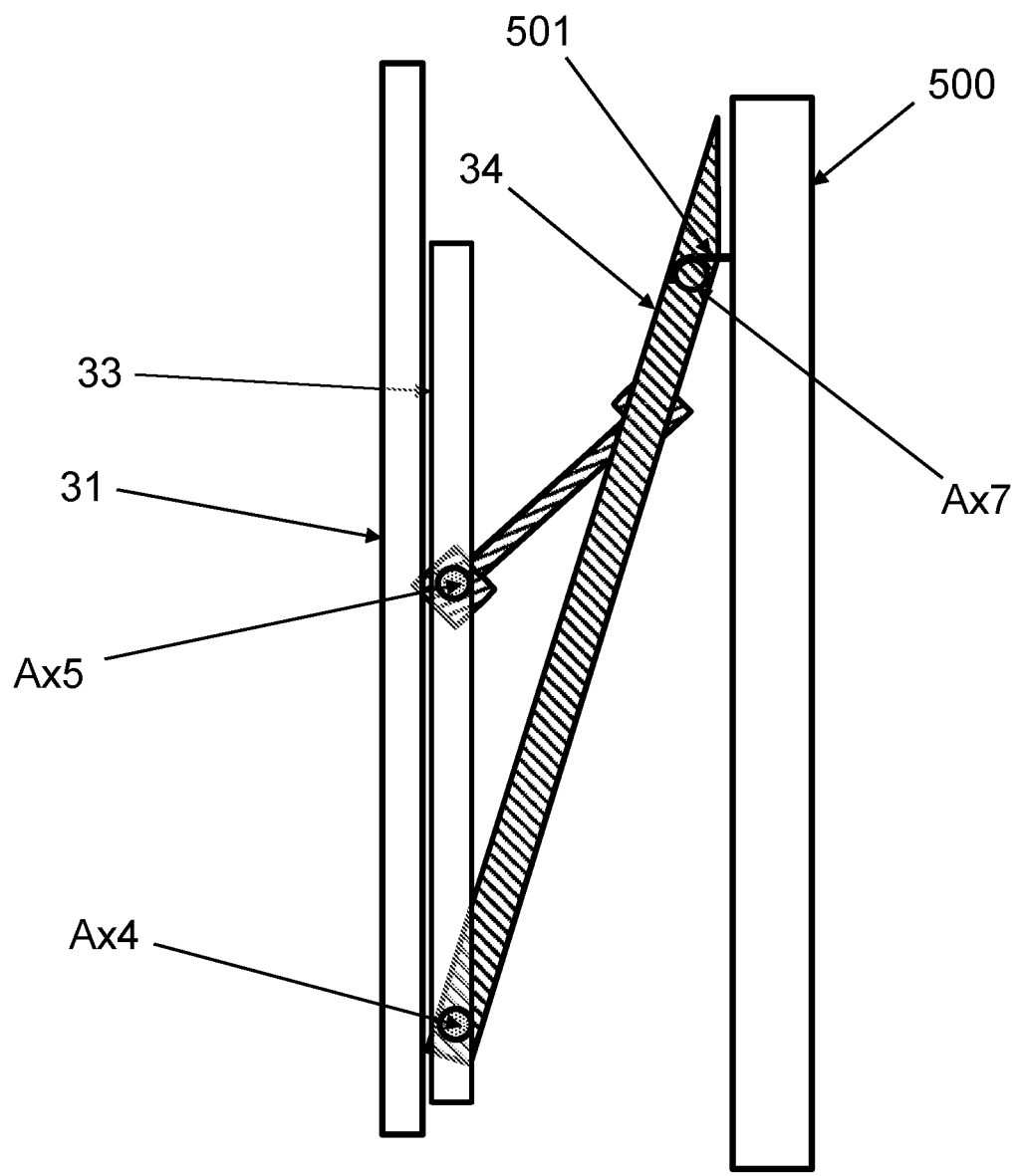

The cross sections on FIGS. 10C and 10D shows the position at rest of the display tile 500 with respect to the support substructures and in particular with respect to the third support substructure 34.

One or more hooks 505 fastened to the back of the display tile 500 are spread along the axis Ax7 around which the display tile 500 can rotate.

Figure 12:
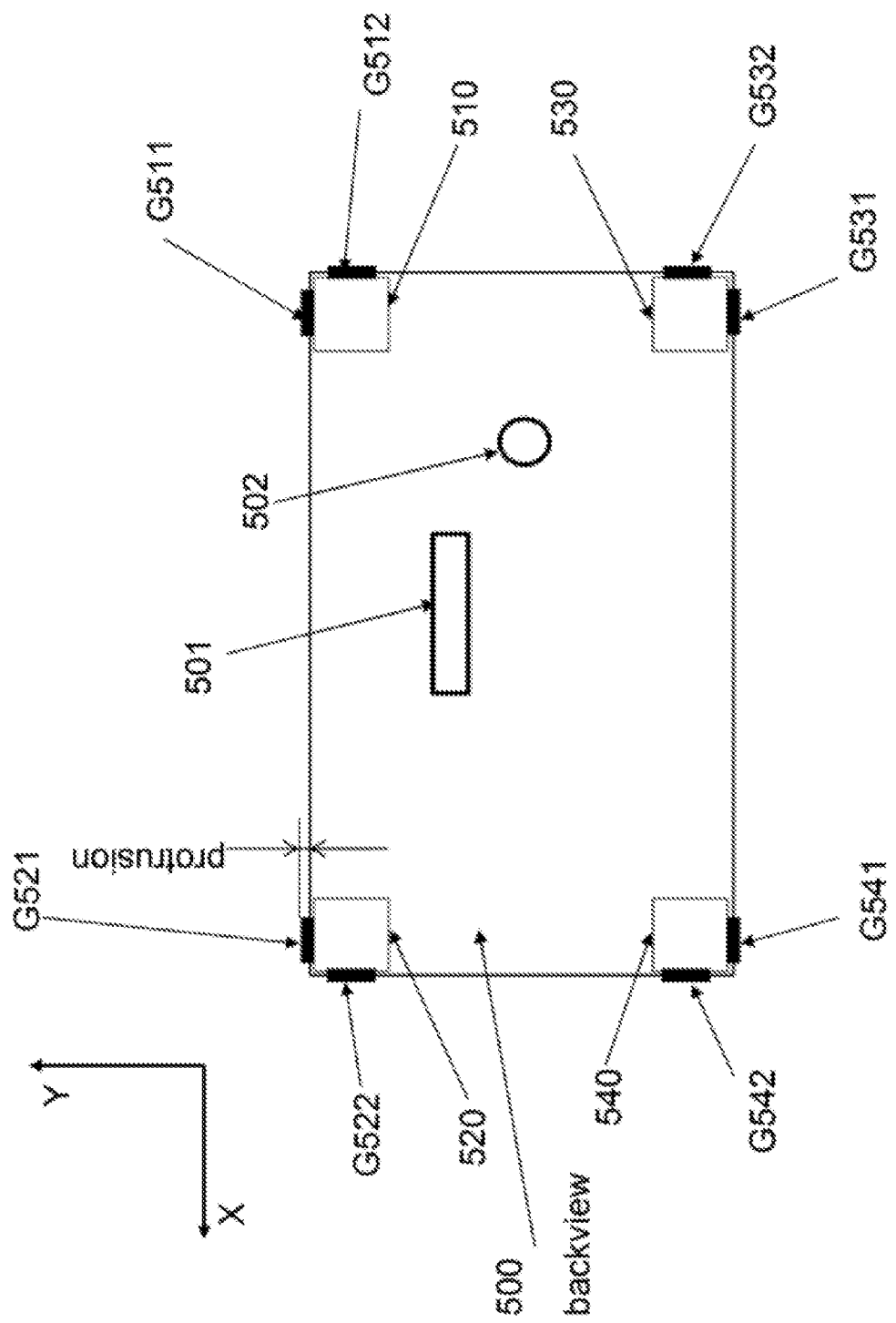
FIG. 12 shows a schematic representation of the position of connectors on the back of a display tile.

The display tile 500 has one or more connectors (e.g. 501 for data and control signals and 502 for power on FIG. 12) on its backside of the tile.

Connectors to connect electronic modules (like a Power Supply Unit and processing means) to control and supply power to the display tile 500 are preferably installed on the second support substructure 33. The PSU and the processing means can be fastened either to the first support substructure 31 or the second support substructure 33 as long as the electric connections (like cables) between the PSU and processing means on one hand and the connectors on the second support substructure that will mate with the corresponding connectors 501 and 502 can accommodate the movement of the display tile from the first position P1 to the second position P2.

In another example of embodiment of the invention, each display tile of a tiled display is fastened to a support structure by means of at least one support substructure (33) to which the display tile can be fastened, the at least one support substructure being characterized in that it is linked to the support structure by means of a first mechanism allowing movements of the display tile in a plane parallel to the nominal plane of the tiled display. The at least one support substructure corresponds to the second support substructure 33 of the previous embodiment. In that case, each of the second support substructures is fastened to a common support structure without the need for a first support substructure 31. As in the previous embodiment, a driving mechanism can be provided to drive more than one display tile, e.g. the tiles that are positioned in column (in a direction parallel to the local vertical). Alternatively each of the tiles can have its own driving mechanism (e.g. a motor that is activated wirelessly). For instance, for a tiled display comprising three columns, each column having three display tiles, activating the driving means of tile T8 will move tiles T8 and T7 away from the rest of the display tiles along the direction DIR. The difference with the previous embodiment being that tile T9 can keep its position. The movements imposed to tile T8 and T7 can be different. For instance, the motor associated to the first mechanism of tile T7 can bring the tile T7 to its second position P2 while at the same time the motor associated with the first mechanism of tile T8 will bring the tile T8 to its third position P3 thereby creating a gap all around the tile T8.

The advantage of the first support substructure is that it can be used to correct tolerances affecting the support structure (i.e. a wall and/or a network of trusses) in order to improve the precision of the alignment of the display tiles not only in the X and Y direction but in the Z direction as well.

1. Means for aligning display tiles or other structures such as frames in the Z direction relates to a dependent or independent aspect of embodiments of the present invention. Aligning up to 4 adjacent tiles is done by means of at least one alignment mechanism 32 which is shown in FIG. 3 (32A, 32B, 32C are visible and 32D is hidden). The alignment mechanism 32 shown in FIG. 3 may be used as a dependent alignment element with any of the embodiments described with reference to FIGS. 3 to 12. These combinations are herewith expressly incorporated into and disclosed in the present invention. The alignment element 32 as described in detail with reference to FIGS. 13 to 15 can be used with any of the embodiments described with reference to FIGS. 3 to 12 and these combinations are expressly incorporated into and disclosed in the present invention. In particular, a support substructure (33) can be fastened to a support structure such as a wall by the intermediary of another support substructure (31) which is fastened to the support structure by means of the alignment mechanism (32). The alignment mechanism (32) can be used for aligning adjacent display tiles.

The alignment mechanism 32 shown in FIGS. 13 to 15 also relates to an independent device which can be used with a variety of frames or structures not just those described with reference to FIGS. 3 to 12.

In particular these embodiments of the present invention (as shown in detail in FIGS. 13 to 15 and FIG. 3) can relate to a support substructure for use in fastening a tiled display having an array of display tiles, to a first support structure, the support substructure being for fastening to the support structure by means of an alignment mechanism (32), the alignment mechanism being for aligning adjacent display tiles, further comprising a first fastening bolt (250) perpendicular to the first support structure, further comprising means for displacement of the alignment mechanism (32) in the direction parallel to the axis of the first fastening bolt (250).

Figure 13A:
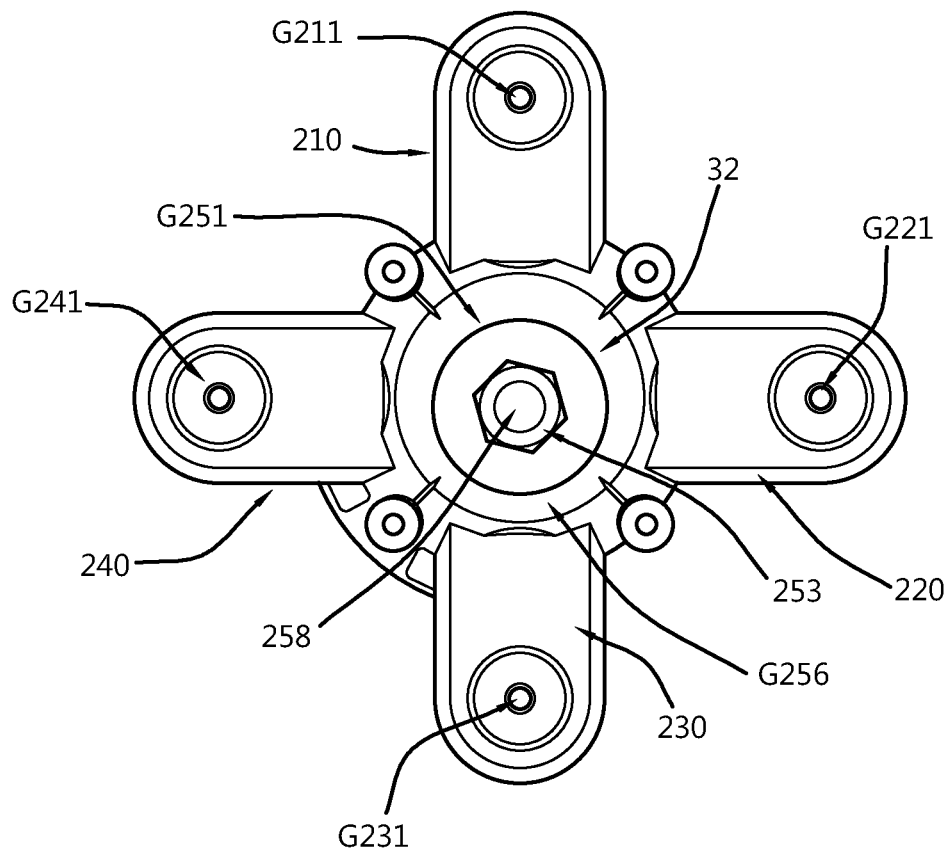
FIGS. 13A and 13B show views of an alignment mechanism (like 32A, 32B, 32C and 32D) to align adjacent display tiles.
Figure 13B:
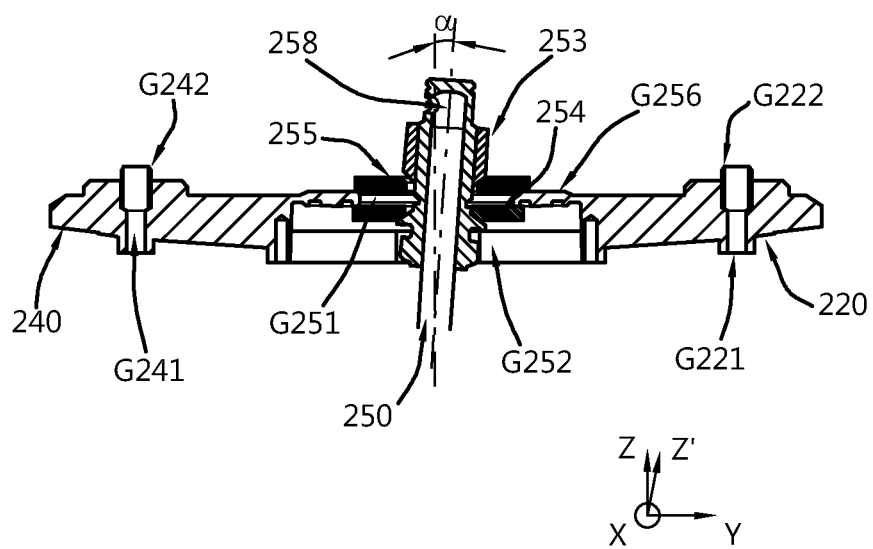

FIG. 13A shows a top view of element 32 and FIG. 13B shows a cross section in accordance with an embodiment of the present invention.

Element 32 comprises a central section G256. The central section G256 can e.g. be cylinder shaped. Arms 210, 220, 230 and 240 are fastened to the central section. Arms and central section can e.g. be machined in the same block of material (e.g. steel, aluminum . . . ). In the preferred example of FIG. 13A, the arms are positioned symmetrically around the central section (two consecutive arms are separated by an angle of preferably 90°). Each arm of an alignment mechanism can be fastened to a different first support substructure. In the example of FIG. 13A, a hole in each of the arms can receive a pin or screw to be fastened to a first support substructure (hole G211 in arm 210, hole G221 in arm 220).

The alignment mechanism 32 can be fastened to a tiled display support structure (e.g. a wall). In the example of FIGS. 13A and 13B, this can be done by first fastening a bolt 250 preferably perpendicular to the tiled display support structure or wall (not shown in FIGS. 13A and 13B).

Elements 250 and 258 preferably have a matching thread. Element 258 together with the alignment mechanism 32 is screwed onto the bolt 250. Rotation of the element 258 around the bolt 250 hence allows displacements of the alignment mechanism in the direction parallel to the axis of the bolt 250. Especially preferred is a solution where alignment mechanism 32 is free to rotate around element 258 until the nut 253 is fastened.

The bolt 250 and the carrier 258 are going through a preferably spring loaded section G252 that allows movement in the X and Y directions of the alignment mechanism 32 around the carrier 258 within the limits of the opening G251. The presence of a spring-loaded section G252 in absence of other higher forces enables self-centering of the alignment mechanism 32 around the bolt 250. The alignment mechanism can be tilted with respect to the bolt (the angle α can vary) as long as the nut 253 is not fastened.

Hence, the alignment mechanism can be moved relatively to the bolt 250 with all 6 degrees of freedom (3 translational and 3 rotational directions) before being fixed relatively to the bolt.

After the alignment mechanism 32 is put in the desired position, the carrier 258 is fastened on the bolt with a counter nut (not shown in FIG. 13B) which is put on the bolt 250 directly below the carrier 258. The alignment mechanism then is fastened relative to the carrier 258 by tightening the nut 253 thus clamping the discs 254 and 255 in the central section G256 and in between carrier 258 and nut 253 through the opening G251.

Figure 14A:
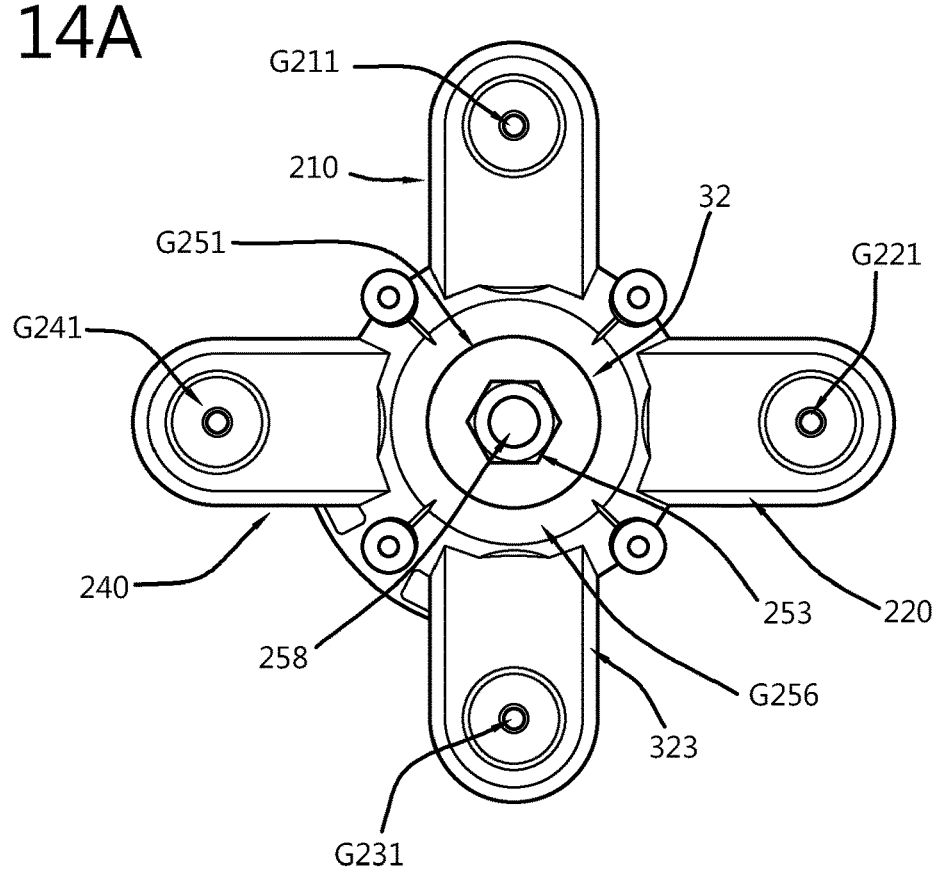
Figure 14B:
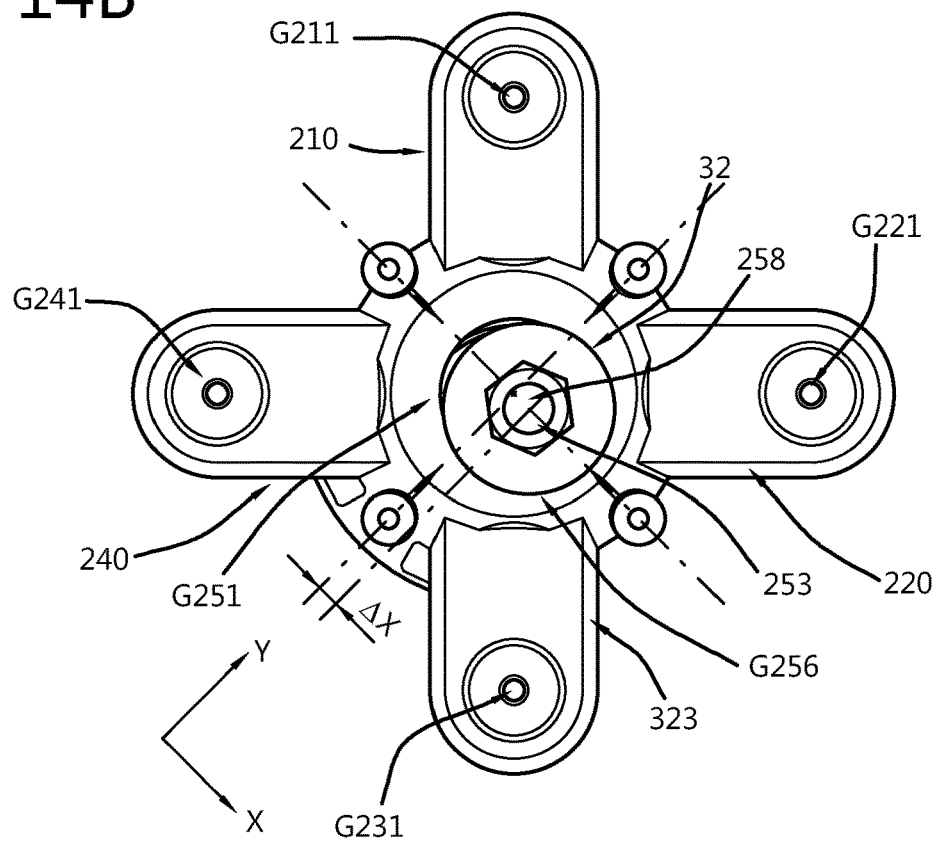

FIG. 14A shows a top view of the alignment mechanism with the alignment mechanism 32, the spring loaded section G252 and bolt 250 perfectly centered. FIGS. 14B and 14C illustrate how the alignment mechanism 32 can move with respect to the bolt 250 and carrier 258.

FIG. 14C shows displacement ΔY of the alignment mechanism in the Y direction made possible by the spring loaded section G252.

The allowed translational and angular displacements of the bolt 250 within the opening G251 by the preferably spring loaded section G252 make it possible to install adjacent tiles without increasing the seam around the panels in spite of tolerances on the position of the bolt holes used to fasten the tiles to e.g. a wall.

Figure 15A:
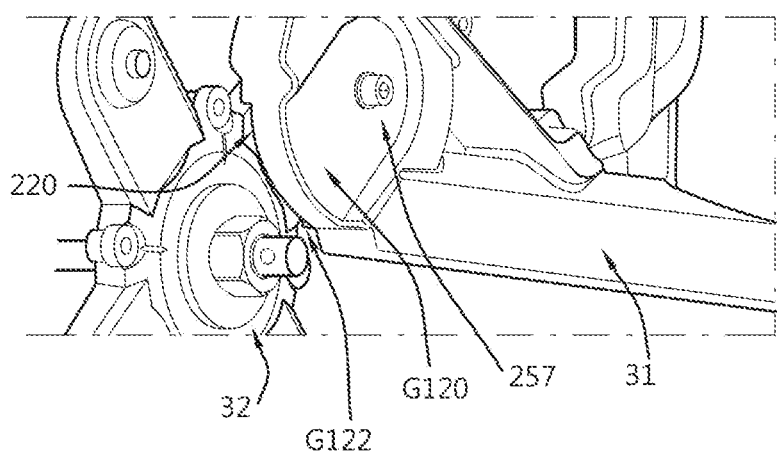
FIGS. 15A and 15B show view of an adjustment mechanism and the first support substructure (31).
Figure 15B:
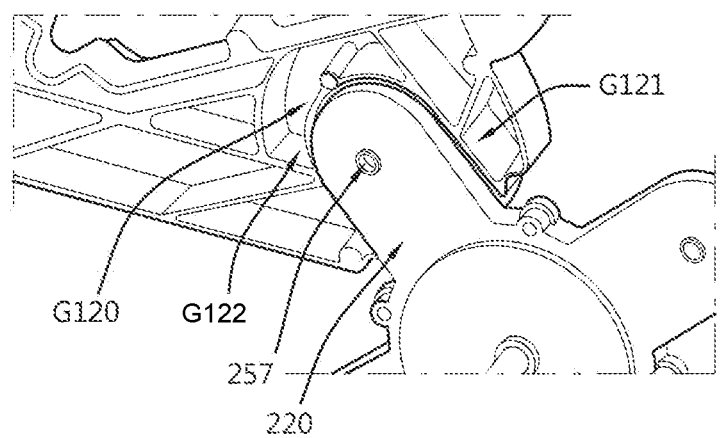

As illustrated on FIGS. 15A and 15B, fastening a first support substructure 31 to the alignment mechanism 32 can be done with a single bolt 257 fastened in one of the geometries G211, G221, G231, G241, in particular if the first support substructure 31 has a mating section G120 corresponding to an arm e.g. 220 of the alignment mechanism 32. The walls G121 and G122 of the mating section on both sides of the arm 220 will prevent rotation of the arm 220 around the axis of the bolt 257. The pin shaped geometries on each arm (e.g. G222 on arm 220, see FIG. 13B) fit each into a hole in the extensions (130 and 140) of the first support substructure 31, thus positioning the support substructure 31 in relation to the alignment mechanism (32) as well as in relation to possible adjacent support structures. Especially preferred is a geometry, where the hole for the bolt (257) in each of the arms (210, 220, 230, 240) is positioned within the pin shaped geometry (e.g. hole G221 within pin G222 in arm 220, see FIG. 13A). Alternatively it is thinkable to substitute the pin shaped geometries (e.g. 222) on the alignment mechanism (32) with bolt shaped geometries fixed on top of the pins (like a fixing bolt) and to substitute the bolts (257) with nuts.

FIGS. 15A and 15B also indicate that for the preferred design of the alignment mechanism as illustrated in FIG. 13A, in case of a tiled display wall incorporating n*m display tiles 500 and preferably (n+1)*(m+1) alignment mechanisms 32, at the outer circumference of the tiled display wall at least two out of the four holes G211, G221, G231, G241 of each alignment mechanism are not used to keep a support structure fixed. These can be used when adding further support structures to the tiled display wall at a later stage.

Summarising the above a support substructure is disclosed wherein the alignment mechanism 32 comprises an element with a central section, the central section having arms that are fastened to the central section, the arms radiating out from the central section. They radiate in a diverging manner. The arms can be positioned symmetrically around the central section and optionally two consecutive arms are separated by an angle of 90°. A hole in each of the arms can be used to receive a pin or screw to be fastened to the first support substructure. A first element 258 together with the alignment mechanism 32 can be screwed onto the first fastening bolt 250. The means for displacement of the alignment mechanism in the direction parallel to the axis of the first fastening bolt 250 is by rotation of the first fastening bolt 250. The alignment mechanism 32 can be made free to rotate around the first element 258 until a nut 253 is fastened.

The first fastening bolt 250 and the first element 258 can go through a spring loaded section G252 that allows movement in orthogonal directions of the alignment mechanism 32 around the first element 258) within the limits of an opening G251. The spring-loaded section G252, in absence of other higher forces enables self-centering of the alignment mechanism 32 around the first fastening bolt 250. The alignment mechanism 32 can be tilted with respect to the first fastening bolt as long as the nut 253 is not fastened.

The alignment mechanism 32 can be moveable relative to the first fastening bolt 250 with all 6 degrees of freedom before being fixed relatively to the first fastening bolt. The alignment mechanism 32 can be fastened relative to the first element 258 by a tightened nut 253 thus clamping discs 254, 255 in the central section G256 and in between first element 258 and nut 253 through the opening G251. The first element 258 can be fastened on the bolt with a counter nut which is put on the bolt 250 directly below the first element 258. The allowed translational and angular displacements of the first fastening bolt 250 within the opening G251 by the spring loaded section G252 allow installed adjacent tiles not to have an increase of the seam around panels in spite of tolerances on the position of the bolt holes used to fasten the tiles.

A first support substructure 31 can be fastened to the alignment mechanism 32 with a single bolt 257 fastened in one of geometries G211, G221, G231, G241. The first support substructure 31 has a mating section G120 corresponding to an arm (220) of the alignment mechanism (32). Walls G121 and G122 of the mating section on both sides of the arm 220 prevent rotation of the arm 220 around the axis of the single bolt 257. Pin shaped geometries on each arm (G222 on 220) fit each into a hole in extensions (130 and 140) of the first support substructure (31), thus positioning the support substructure 31 in relation to the alignment mechanism 32 as well as in relation to any adjacent support structures. A geometry, wherein the hole for the single bolt 257 in each of the arms 210, 220, 230, 240 is positioned within the pin shaped geometry, e.g. G221 within pin G222 in arm 220. Bolt shaped geometries can be fixed on the alignment mechanism 32 on top of the pins and to substitute the single bolts 257 with nuts. In the case of a tiled display wall incorporating n*m display tiles 500 and (n+1)*(m+1) alignment mechanisms 32, at the outer circumference of the tiled display wall at least two out of the four holes G211, G221, G231, G241 of each alignment mechanism 32 are not used to keep a support structure being fixed. The at least two out of the four holes can be used when adding further support structures to the tiled display wall.

A tiled display can be connected to the support structure as disclosed above. The alignment element 32 can be used with a support substructure for fastening a display tile 500 to a support structure of a tiled display, the support substructure 33 being characterized in that it is linked to the support structure by means of a first mechanism allowing movements of the display tile in a plane parallel to the nominal plane (XY) of the tiled display independently of the presence or absence of adjacent display tiles. The alignment element 32 can be used with a support substructure 33 each for fastening a display tile 500 to a support structure of a tiled display, adjacent display tiles in the tiled display being separated by a nominal seam, the support substructure 33 being characterized in that it is linked to the support structure by means of a first mechanism allowing movements of each display tile in a plane parallel to the nominal plane (XY) of the tiled display to form a gap (G) between adjacent display tiles obtained by moving one or more display tiles from a first position (P1) to a second position (P2) and a second mechanism fixing the position of the at least one support substructure 33 in the second position, wherein the gap (G) is larger than the nominal seam.

The alignment element 32 can be used with the first mechanism which can be driven by e.g. a motor or a hand crank or a key. The first mechanism can include means to transform a rotary movement into a translation of the at least one support substructure. The alignment element 32 can be used with the first mechanism when it comprises a quadrant gear 312 and a pin (331), the quadrant gear being for exerting a force on the support substructure (33) by the intermediary of the pin 331. The alignment element 32 can be used with the first mechanism when it comprises guiding means to help controlling the direction and/or amplitude of the movement of the support substructure. The alignment element 32 can be used with a release mechanism. The alignment element 32 can be used with a display tile that has one or more contact elements (510, 520, 530, and 540) for exerting a force on an adjacent display tile. The contact elements can be used to provide self-alignment when the tiles are close as possible to each other. The alignment element 32 can be used with a second mechanism which can fix the position of the at least one support substructure (33). The second mechanism van comprise a lever or hammer 316 that can take two positions and a pin 332 fastened to the support substructure: in a first position, the hammer cannot prevent free movement of the pin 332, and in a second position H2, the hammer prevent free movement of the pin 332. The alignment element 32 can be used with a display tile (500) which is fastened or mated to the support substructure 33 by the intermediary of another support substructure 34 the other support substructure 34 comprising a mechanism for moving the display tile outside of the display plane (XY).

The invention claimed is:

1. Support substructures each for fastening a display tile to a support structure of a tiled display, adjacent display tiles in the tiled display being separated by a nominal seam, the support substructures comprising:
　a support substructure;
　a first mechanism that links the support substructure to the support structure, wherein the first mechanism is configured to allow movements of each display tile in a plane parallel to a nominal plane (XY) of the tiled display to form a gap between adjacent display tiles obtained by moving one or more display tiles from a first position (P1) to a second position (P2); and
　a second mechanism configured to fix the position of the first support substructure in the second position,
　wherein the gap is larger than the nominal seam,
　wherein the display tile has one or more contact elements configured to exert a force on an adjacent display tile, and
　wherein the contact elements self-align the display tile with the adjacent display tile.

2. The support substructures according to claim 1, wherein the first mechanism is configured to be driven by a motor or a hand crank or a key.

3. The support substructures according to claim 1, wherein the first mechanism includes means to transform a rotary movement into a translation of the support sub structure.

4. The support substructures according to claim 1, wherein the first mechanism comprises a quadrant gear and a pin, the quadrant gear configured to exert a force on the support substructure by the intermediary of the pin.

5. The support substructures according to claim 1, wherein the first mechanism comprises guiding means configured to control the direction and/or amplitude of the movement of the support substructure.

6. The support substructures according to claim 1, further comprising a release mechanism.

7. The support substructures according to claim 1, wherein the second mechanism comprises a lever or hammer that can take two positions and a pin fastened to the support substructure: wherein in a first position, the pin is configured to be able to move freely; and in a second position, the hammer prevents free movement of the pin.

8. The support substructures according to claim 1, wherein the display tile is fastened or mated to the support substructure by the intermediary of another support substructure, the another support substructure comprising a mechanism for moving the display tile outside of the display plane (XY).

9. A tiled display comprising support substructures according to claim 1.

10. The tiled display according to claim 9, wherein the support substructures are fastened to the support structure by the intermediary of an additional support substructure which is fastened to the support structure by means of an alignment mechanism, the alignment mechanism being for aligning adjacent display tiles.

11. A method for manipulating display tiles each display tile being fastened to a support structure of a tiled display using a support substructure, adjacent display tiles in the tiled display being separated by a nominal seam, the method comprising:
　mechanically linking the support substructure to the support structure;
　moving one or more display tiles in a first movement in a plane parallel to a nominal plane (XY) of the tiled display to form a gap between adjacent display tiles obtained by moving one or more display tiles from a first position (P1) to a second position (P2) and fixing the position of the support substructure in the second position, wherein the gap is larger than the nominal seam; and
　self-aligning the display tile using one or more contact elements for exerting a force on an adjacent display tile.

12. The method according to claim 11, wherein the first movement is driven by a motor or a hand crank or a key.

13. The method according to claim 11 wherein the first movement includes transforming a rotary movement into a translation of the support sub structure.

14. The method according to claim 11, further comprising guiding the first movement to control the direction and/or amplitude of the first movement.

15. The method according to claim 11, further comprising fastening or mating the display tile to the support substructure by the intermediary of an another support substructure, further comprising a further movement for moving the display tile outside of the display plane (XY).

16. A support substructure configured to fasten a tiled display having an array of display tiles, to a support structure, the support substructure comprising:
　an alignment mechanism configured to fasten the support substructure to the support structure, the alignment mechanism being configured to be adjustable to align adjacent display tiles with respect to each other, further comprising a first fastening bolt perpendicular to the support structure,
　the support substructure further comprising means for displacement of the alignment mechanism in the direction parallel to the axis of the first fastening bolt.

17. A method of manipulating a support substructure that is used to fasten a tiled display having an array of display tiles, to a support structure, the method comprising:
　fastening the support substructure to the support structure by means of an alignment mechanism, and
　aligning adjacent display tiles with respect to each other with the alignment mechanism, wherein the alignment mechanism is adjustable,
　wherein the alignment mechanism has a first fastening bolt perpendicular to the support structure, and the method comprising displacing the alignment mechanism in a direction parallel to the axis of the first fastening bolt.

* * * * *